(12) United States Patent
Shih et al.

(10) Patent No.: US 9,887,429 B2
(45) Date of Patent: Feb. 6, 2018

(54) LAMINATED LITHIUM BATTERY

(75) Inventors: Tung-Hsiu Shih, Cerrito, CA (US); Kai Wei Nieh, Monrovia, CA (US); Victor Krasnov, Tarzana, CA (US); Jiuh-Ming Liang, Hacienda Heights, CA (US)

(73) Assignee: Front Edge Technology Inc., Baldwin Park, CA (US)

( * ) Notice: Subject to any disclaimer, the term of this patent is extended or adjusted under 35 U.S.C. 154(b) by 293 days.

(21) Appl. No.: 13/333,969

(22) Filed: Dec. 21, 2011

(65) Prior Publication Data
US 2013/0164607 A1    Jun. 27, 2013

(51) Int. Cl.
*H01M 10/04*    (2006.01)
*H01M 10/052*    (2010.01)

(52) U.S. Cl.
CPC ..... *H01M 10/0436* (2013.01); *H01M 10/052* (2013.01); *Y10T 29/49115* (2015.01); *Y10T 29/53135* (2015.01)

(58) Field of Classification Search
None
See application file for complete search history.

(56) References Cited

U.S. PATENT DOCUMENTS

| | | |
|---|---|---|
| 3,375,135 A | 3/1968 | Moulton et al. |
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |
| 3,993,508 A | 11/1976 | Erlichman |
| 4,031,449 A | 6/1977 | Trombly |
| 4,119,769 A | 10/1978 | Schneider et al. |
| 4,233,371 A | 11/1980 | Dorrestijn |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |

(Continued)

FOREIGN PATENT DOCUMENTS

| | | |
|---|---|---|
| CN | 1661354 A | 8/2005 |
| EP | 0 829 913 A | 3/1998 |

(Continued)

OTHER PUBLICATIONS

Antaya et al. "Preparation and Characterization of LiCoO2 Thin Films by Laser Ablation Deposition", J. Electrochem. Soc., vol. 140, No. 3, Mar. 1993, pp. 575-578.

(Continued)

*Primary Examiner* — Yoshitoshi Takeuchi
(74) *Attorney, Agent, or Firm* — Ashok K. Janah; Janah & Associates, P.C.

(57) ABSTRACT

A lithium battery comprises at least one battery cell on a support, the battery cell comprising a plurality of electrodes about an electrolyte. A protective casing comprises a cover spaced apart from and covering the battery cell to form a gap therebetween with a polymer filling the gap. In one version, the polymer comprises polyvinylidene chloride polymer. First and second terminals extend out of the protective casing, the first and second terminals being connected to different electrodes of the battery cell.

25 Claims, 10 Drawing Sheets

(56) References Cited

U.S. PATENT DOCUMENTS

| | | | |
|---|---|---|---|
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,882,212 A | 11/1989 | SingDeo et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,250,891 A | 10/1993 | Glasgow |
| 5,253,300 A | 10/1993 | Knapp |
| 5,254,415 A | 10/1993 | Williams et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,478,456 A | 12/1995 | Humpal et al. |
| 5,490,911 A | 2/1996 | Makowiecki et al. |
| 5,498,490 A | 3/1996 | Brodd |
| 5,503,912 A | 4/1996 | Setoyama et al. |
| 5,506,858 A | 4/1996 | Takenaka et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates et al. |
| 5,629,560 A | 5/1997 | Katsui et al. |
| 5,650,243 A | 7/1997 | Ferment et al. |
| 5,656,364 A | 8/1997 | Rickerby et al. |
| 5,663,183 A | 9/1997 | Frost et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,708,297 A | 1/1998 | Clayton |
| 5,725,909 A | 3/1998 | Shaw et al. |
| 5,814,159 A | 6/1998 | Lehan et al. |
| 5,786,582 A | 7/1998 | Roustaei et al. |
| 5,818,199 A | 10/1998 | Beard |
| 5,824,374 A | 10/1998 | Bradley, Jr. et al. |
| 5,871,865 A | 2/1999 | Barker et al. |
| 5,894,656 A | 4/1999 | Menon et al. |
| 5,932,368 A | 8/1999 | Batawi et al. |
| 5,961,672 A | 10/1999 | Skotheim et al. |
| 5,981,102 A | 11/1999 | Grigg et al. |
| 5,985,485 A | 11/1999 | Ovshinsky et al. |
| 6,017,654 A | 1/2000 | Kumta et al. |
| 6,022,640 A | 2/2000 | Takada et al. |
| 6,039,850 A | 3/2000 | Schulz |
| 6,040,680 A | 3/2000 | Toya et al. |
| 6,046,575 A | 4/2000 | Demuro |
| 6,051,114 A | 4/2000 | Yao et al. |
| 6,118,248 A | 9/2000 | Gartstein et al. |
| 6,146,715 A | 11/2000 | Kim et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,220,765 B1 | 4/2001 | Tatoh |
| 6,227,204 B1 | 5/2001 | Baumann et al. |
| 6,238,847 B1 | 5/2001 | Axtell, III et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,365,010 B1 | 4/2002 | Hollars |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,461,757 B1 * | 10/2002 | Sasayama et al. ............... 429/59 |
| 6,472,295 B1 | 10/2002 | Morris et al. |
| 6,517,968 B2 | 2/2003 | Johnson |
| 6,558,836 B1 | 5/2003 | Whitacre et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,680,145 B2 | 1/2004 | Obrovac |
| 6,696,199 B2 | 2/2004 | Yoshida et al. |
| 6,700,766 B2 | 3/2004 | Sato |
| 6,713,987 B2 | 3/2004 | Krasnov et al. |
| 6,780,544 B2 | 8/2004 | Noh |
| 6,805,998 B2 | 10/2004 | Jenson et al. |
| 6,863,699 B1 | 3/2005 | Krasnov et al. |
| 6,866,901 B2 | 3/2005 | Burrows et al. |
| 6,916,679 B2 | 7/2005 | Snyder et al. |
| 6,921,464 B2 | 7/2005 | Krasnov et al. |
| 6,940,988 B1 | 9/2005 | Shennib et al. |
| 6,982,132 B1 | 1/2006 | Goldner et al. |
| 7,037,621 B2 | 5/2006 | Kikuchi et al. |
| 7,056,620 B2 | 6/2006 | Krasnov et al. |
| 7,122,908 B2 | 10/2006 | Jiang et al. |
| 7,131,189 B2 | 11/2006 | Jenson |
| 7,157,187 B2 | 1/2007 | Jenson |
| 7,186,479 B2 | 3/2007 | Krasnov et al. |
| 7,194,801 B2 | 3/2007 | Jenson et al. |
| 7,194,901 B2 | 3/2007 | Silverbrook et al. |
| 7,286,479 B2 | 3/2007 | Bragg |
| 7,276,878 B2 | 10/2007 | Phillips et al. |
| 7,308,316 B2 | 12/2007 | Schommer |
| 7,359,590 B2 | 4/2008 | Hsu |
| 7,397,118 B2 | 7/2008 | Tominaga |
| 7,501,202 B2 | 3/2009 | Enomoto et al. |
| 7,510,582 B2 | 3/2009 | Krasnov et al. |
| 7,524,577 B2 | 4/2009 | Bates |
| 7,701,176 B2 | 4/2010 | Chen |
| 7,846,579 B2 | 12/2010 | Krasnov et al. |
| 7,862,627 B2 | 1/2011 | Li et al. |
| 7,862,927 B2 | 1/2011 | Krasnov et al. |
| 8,030,898 B2 | 10/2011 | Okuto |
| 8,168,322 B2 | 5/2012 | Krasnov et al. |
| 2001/0007335 A1 | 7/2001 | Tuttle et al. |
| 2001/0041294 A1 | 11/2001 | Chu et al. |
| 2001/0052645 A1 | 12/2001 | Op'T Eynde et al. |
| 2002/0004167 A1 | 1/2002 | Jenson et al. |
| 2002/0028384 A1 | 3/2002 | Krasnov et al. |
| 2002/0041930 A1 | 4/2002 | Erdemir et al. |
| 2002/0071989 A1 | 6/2002 | Verma et al. |
| 2002/0100989 A1 | 8/2002 | Jiang et al. |
| 2002/0102400 A1 | 8/2002 | Gorokhovsky et al. |
| 2002/0110733 A1 | 8/2002 | Johnson |
| 2002/0156823 A1 | 10/2002 | Breitkopf et al. |
| 2003/0121142 A1 | 7/2003 | Kikuchi et al. |
| 2003/0143460 A1 | 7/2003 | Yoshida et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |

(56) References Cited

U.S. PATENT DOCUMENTS

| | | |
|---|---|---|
| 2005/0079418 A1 | 4/2005 | Kelley et al. |
| 2005/0112461 A1 | 5/2005 | Amine et al. |
| 2005/0130032 A1 | 6/2005 | Krasnov et al. |
| 2005/0147877 A1 | 7/2005 | Tarnowski et al. |
| 2005/0156573 A1 | 7/2005 | Lin |
| 2005/0275370 A1 | 12/2005 | Kim |
| 2006/0027937 A1 | 2/2006 | Benson et al. |
| 2006/0040169 A1 | 2/2006 | Liu et al. |
| 2006/0040170 A1 | 2/2006 | Liu et al. |
| 2006/0060956 A1 | 3/2006 | Tanikella |
| 2006/0068258 A1 | 3/2006 | Kinoshita |
| 2006/0115706 A1 | 6/2006 | Maeda et al. |
| 2006/0134522 A1 | 6/2006 | Zhang et al. |
| 2006/0152196 A1 | 7/2006 | Matsumoto et al. |
| 2006/0216589 A1 | 9/2006 | Krasnov et al. |
| 2006/0226812 A1 | 10/2006 | Patino et al. |
| 2006/0267546 A1 | 11/2006 | Shen et al. |
| 2007/0000688 A1 | 1/2007 | Mobley |
| 2007/0037054 A1 | 2/2007 | Kikuchi et al. |
| 2007/0047750 A1 | 3/2007 | Sauer et al. |
| 2007/0047796 A1 | 3/2007 | Anantharaman |
| 2007/0104343 A1 | 5/2007 | Bengtsson et al. |
| 2007/0104344 A1 | 5/2007 | Goldberg |
| 2007/0125638 A1 | 6/2007 | Zhang et al. |
| 2007/0141460 A1 | 6/2007 | You et al. |
| 2007/0166612 A1 | 7/2007 | Krasnov et al. |
| 2007/0172739 A1 | 7/2007 | Visco et al. |
| 2007/0200258 A1 | 8/2007 | Mahler et al. |
| 2007/0297108 A1 | 12/2007 | Collins et al. |
| 2008/0003492 A1 | 1/2008 | Bates |
| 2008/0087986 A1 | 4/2008 | Tanikella |
| 2008/0191342 A1 | 8/2008 | Otremba |
| 2008/0213664 A1 | 9/2008 | Krasnov et al. |
| 2008/0217162 A1 | 9/2008 | Delrue et al. |
| 2008/0253098 A1 | 10/2008 | Liu |
| 2008/0263855 A1* | 10/2008 | Li .................... H01M 10/0436 29/623.5 |
| 2008/0290363 A1 | 11/2008 | Lin et al. |
| 2008/0303056 A1 | 12/2008 | Ward et al. |
| 2008/0308935 A1 | 12/2008 | Kim et al. |
| 2009/0010462 A1 | 1/2009 | Ekchian et al. |
| 2009/0029500 A1 | 1/2009 | Wan |
| 2009/0039498 A1 | 2/2009 | Bayerer |
| 2009/0057136 A1 | 3/2009 | Wang et al. |
| 2009/0114429 A1 | 5/2009 | Sri-Jayantha et al. |
| 2009/0115051 A1 | 5/2009 | Leung et al. |
| 2009/0136839 A1 | 5/2009 | Krasnov et al. |
| 2009/0208671 A1 | 8/2009 | Nieh et al. |
| 2010/0028767 A1 | 2/2010 | Inose et al. |
| 2010/0247987 A1 | 9/2010 | Holung et al. |
| 2010/0291431 A1* | 11/2010 | Shih et al. .................... 429/159 |
| 2011/0050159 A1 | 3/2011 | Nieh et al. |
| 2011/0076550 A1* | 3/2011 | Liang .................. H01M 2/0202 429/175 |
| 2011/0094094 A1 | 4/2011 | Li et al. |
| 2011/0270477 A1 | 11/2011 | Falsett et al. |
| 2012/0003520 A1 | 1/2012 | Lee et al. |
| 2012/0034502 A1 | 2/2012 | Nieh et al. |
| 2012/0080940 A1 | 2/2012 | Larsen |
| 2012/0251867 A1 | 10/2012 | Krasnov et al. |
| 2012/0268057 A1 | 10/2012 | Wu |

FOREIGN PATENT DOCUMENTS

| | | |
|---|---|---|
| EP | 1 353 429 A | 10/2003 |
| EP | 1 458 037 A | 9/2004 |
| EP | 1615287 A1 | 1/2006 |
| EP | 1415355 | 1/2008 |
| FR | 2 403 652 A | 4/1979 |
| GB | 2251119 A | 6/1992 |
| JP | 59-032023 A | 2/1984 |
| JP | 59-226472 A | 12/1984 |
| JP | 60-072168 | 4/1985 |
| JP | 61195563 A | 8/1986 |
| JP | 04-295015 | 10/1992 |
| JP | 09-259929 A | 10/1997 |
| JP | 2001-044073 A | 2/2001 |
| JP | 2002-165358 | 6/2002 |
| JP | 2002-313289 | 10/2002 |
| JP | 2003-249199 A | 9/2003 |
| JP | 2009123516 | 6/2009 |
| WO | WO-95/14311 A | 5/1995 |
| WO | WO-98/08672 A1 | 3/1998 |
| WO | WO-99/23714 | 5/1999 |
| WO | WO-99/52589 A1 | 10/1999 |
| WO | WO-00/60689 A | 10/2000 |
| WO | WO-01/73873 A | 10/2001 |
| WO | WO-02/061828 A2 | 8/2002 |
| WO | WO-02/021627 A3 | 1/2003 |
| WO | WO-02/042516 A3 | 1/2003 |
| WO | WO-03/061049 A | 7/2003 |
| WO | WO-03/073531 A3 | 12/2003 |
| WO | WO-03/005477 A3 | 12/2004 |
| WO | WO-2004/111659 A2 | 12/2004 |
| WO | WO-2006/042357 A1 | 4/2006 |
| WO | WO-2006/105188 A1 | 10/2006 |
| WO | WO-06/105050 A3 | 3/2007 |
| WO | WO-2007/042394 | 4/2007 |
| WO | WO-2008/004851 A1 | 1/2008 |
| WO | WO2008101254 | 8/2008 |
| WO | WO-08/108999 A3 | 11/2008 |
| WO | WO-08/134053 A1 | 11/2008 |
| WO | WO-2009/052683 A1 | 4/2009 |
| WO | WO-2009/073150 | 6/2009 |

OTHER PUBLICATIONS

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

PCT International Search Report in Application No. PCT/US2008/013213 (WO 2009/073150 A1), dated Jun. 18, 2009.

Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.

Non-Final Office Action dated Dec. 13, 2011 in U.S. Appl. 12/454,255, filed May 13, 2009.

Final Office Action dated Aug. 2, 2012 in U.S. Appl. 12/454,255, filed May 13, 2009.

Notice of Allowance dated May 12, 2010 in U.S. Appl. 11/090,408, filed Mar. 25, 2005.

Notice of Allowance dated Sep. 21, 2010 in U.S. Appl. 11/090,408, filed Mar. 25, 2005.

Notice of Allowance dated Jan. 27, 2010 in U.S. Appl. 12/783,520, filed May 19, 2010.

Final Office Action dated Apr. 25, 2012 in U.S. Appl. 12/963,610, filed Dec. 8, 2010.

Non-Final Office Action dated Sep. 21, 2012 in U.S. Appl. 12/963,610, filed Dec. 8, 2010.

Non-Final Office Action dated Aug. 30, 2012 in U.S. Appl. 13/461,753, filed May 1, 2012.

Roh et al., "Effects of deposition condition on the ionic conductivity . . . " Scripta Materialia, Dec. 17, 1999, pp. 43-49, vol. 42. No. 1, New York, NY.

Bolster et al., "Investigation of lithium intercalation metal oxides for thermalbatteries" Proceedings of the 34th Int'l Power Source Symposium, Jun. 25-28, 1990, pp. 136-140.

Yang et al., "Effect of annealing temperature on structure and electrochemical properties of LiCoO2 cathode thin films", Rare Metals, vol. 25, Dec. 2006, pp. 189-192.

Liang et al., U.S. Appl. No. 13/278,082, filed Oct. 20, 2011, for Thin Film Battery Packaging Formed by Localized Heating.

(56) References Cited

OTHER PUBLICATIONS

Nieh et al., U.S. Appl. No. 13/627,977, filed Sep. 26, 2012, for Plasma Deposition on a Partially Formed Battery Through a Mesh Screen.
Shih et al., U.S. Appl. No. 13/626,842, filed Sep. 25, 2012, for Solid State Battery Having Mismatched Cells.
Liang, Jiuh-Ming, U.S. Appl. No. 13/434,775, filed Mar. 29, 2012, for Localized Heat Treatment of Battery Component Films.
Nieh et al., U.S. Appl. No. 13/337,031, filed Dec. 23, 2011, for Sputtering Lithium-Containing Material With Multiple Targets.
Shih et al., U.S. Appl. No. 13/652,416, filed Oct. 15, 2012, for Lithium Battery Having Low Leakage Anode.
PCT International Search Report in Application No. PCT/US2011/046674 dated Feb. 17, 2012.
Bates et al., "Preferred orientation of polycrystalline LiCoO2 films" J. of the Electrochemical Society (2000), pp. 59-70, Issue No. 147 (1).
Wagner et al., "Fabrication and Testing of thermoelectric thin film devices" 15th Int'l Conf. on Thermoelectrics, Mar. 26-29, 1996, pp. 269-273.
Neudecker et al., "Lithium-Free Thin-Film Battery . . ." Journal of the Electrochemical Society (2000), pp. 517-523, Issue No. 147 (2).
Park et al., "Characterization of tin oxide/LiMn2O4 thin-film cell," Journal of Power Sources, Jun. 2000, pp. 250-254, vol. 88, No. 2, Elsevier Science S.A.
PCT International Preliminary Report on Patentability, Application No. PCT/US2008/013213 (WO09/073150), dated Jun. 10, 2010.
PCT International Search Report in Application No. PCT/US2012/063100 dated Feb. 26, 2013.
BASF Elastollan Thermoset Polyurethane, Great Britain, Feb. 2005.
PCT International Search Report in Application No. PCT-US2008-013213, dated Jun. 18, 2009.
PCT International Search Report in Application No. PCT-US2006-011204, dated Apr. 10, 2009.
Notice of Allowance in U.S. Appl. No. 11/090,408 dated Sep. 21, 2010.
Second Notice of Allowance in U.S. Appl. No. 11/090,408 dated May 12, 2010.
Advisory Action in U.S. Appl. No. 11/946,819 dated Dec. 6, 2010.
Final Office Action in U.S. Appl. No. 11/946,819 dated Sep. 13, 2011.
Final Office Action in U.S. Appl. No. 11/946,819 dated Sep. 27, 2010.
Office Action in U.S. Appl. No. 11/946,819 dated Mar. 11, 2010.
Office Action in U.S. Appl. No. 11/946,819 dated May 10, 2011.
Office Action in U.S. Appl. No. 11/946,819 dated Aug. 23, 2013.
Advisory Action in U.S. Appl. No. 12/454,255 dated Nov. 23, 2012.
Final Office Action in U.S. Appl. No. 12/454,255 dated Mar. 26, 2015.
Final Office Action in U.S. Appl. No. 12/454,255 dated Aug. 2, 2012.
Non-Final Office Action U.S. Appl. No. 12/454,255 dated Aug. 23, 2014.
Non-Final Office Action in U.S. Appl. No. 12/454,255 dated Dec. 13, 2011.
Notice of Allowance in U.S. Appl. No. 12/783,520 dated Jan. 27, 2011.
Second Notice of Allowance in U.S. Appl. No. 12/783,520 dated Oct. 13, 2011.
Non-Final Office Action in U.S. Appl. No. 12/963,610 dated Oct. 6, 2011.
Final Office Action in U.S. Appl. No. 12/963,610 dated Apr. 25, 2012.
Non-Final Office Action in U.S. Appl. No. 12/963,610 dated Sep. 21, 2012.
Non-Final Office Action in U.S. Appl. No. 12/963,610 dated Mar. 26, 2013.
Notice of Allowance in U.S. Appl. No. 12/963,610 dated Jun. 18, 2013.
Advisory Action in U.S. Appl. No. 12/963,610 dated Jul. 26, 2012.
Notice of Allowance in U.S. Appl. No. 12/963,610 dated Feb. 14, 2014.
Notice of Allowance in U.S. Appl. No. 13/461,753 dated Mar. 12, 2013.
Non-Final Office Action in U.S. Appl. No. 13/461,753 dated Aug. 20, 2012.

* cited by examiner

LAMINATED LITHIUM BATTERY

BACKGROUND

Embodiments of the present invention relate to lithium batteries and their packaging and fabrication methods.

Lithium batteries are used in applications that require a small battery with a high energy density such as, for example, portable electronics, medical devices and space systems. A typical lithium battery comprises one or more battery component layers that include electrolyte comprising lithium sandwiched between electrode layers, such as an anode, cathode, and/or current collectors. The battery component layers cooperate to store electrical charge and generate a voltage. Lithium batteries include larger scale structures, used for computer and car batteries, and thin film batteries in which the battery component layers are thin films which have thicknesses of less than 100 microns. Lithium batteries can also either be used individually or multiple batteries can be stacked together to provide more power or more energy.

The lithium batteries are packaged in protective packages to protect the battery component layers from the external environment to reduce their degradation over time. Battery component layers containing lithium can degrade when exposed to carbon monoxide, carbon dioxide, oxygen, nitrogen, moisture or even organic solvents present in the atmosphere. Thus protective packaging is used to protect the battery component films from the external environment. Suitable packaging assemblies are, for example, described in commonly assigned U.S. Pat. No. 7,846,579, filed on Mar. 25, 2005, entitled "Thin Film Battery with Protective Packaging", U.S. patent application Ser. No. 12/963,610, filed Dec. 8, 2010, entitled "Battery with Protective Packaging", and U.S. patent application Ser. No. 12/454,255 filed May 13, 2009, entitled "Thin Film Battery with Protective Packaging", all of which are incorporated by reference herein and in their entirety. However, even these advanced packaging structures and packaging methods can be improved upon to reduce long term degradation of the charging and discharge properties of lithium batteries.

Thus still further developments and improvements in packaging technology and methods of fabrication of lithium batteries, including large scale and thin film lithium batteries, are continuously being sought.

SUMMARY

A lithium battery comprises at least one battery cell on a support, the battery cell comprising a plurality of electrodes about an electrolyte. A protective casing comprises a cover spaced apart from and covering the battery cell to form a gap therebetween with polyvinylidene chloride polymer filling the gap. First and second terminals extend out of the protective casing, the first and second terminals being connected to different electrodes of the battery cell.

A battery manufacturing method comprises forming at least one battery cell on a support, the battery cell comprising at least a pair of electrodes about an electrolyte. The battery cell is covered with a polymer comprising polyvinylidene chloride. A cover is placed over the polyvinylidene chloride polymer to contact a top surface of the polymer. The polyvinylidene chloride polymer and cover are laminated to one another by heating while applying a pressure. First and second terminals are extended out of the polymer, the first and second terminals being connected to different electrodes of the battery cell.

A lithium battery comprises a first battery cell on a first support and a second battery cell on a second support, the second battery cell facing the first battery cell to form a gap therebetween. A polyvinylidene chloride polymer fills the gap between the first and second battery cells. First and second terminals extend out of the polyvinylidene chloride polymer, the first and second terminals being connected to the first and second battery cells.

A battery manufacturing method comprises forming a first battery cell on a first support and a second battery cell on a second support. The first and second battery cells are covered with a polymer. The second battery cell is positioned to face the first battery cell so that the polymer is between the first and second battery cells. The first and second battery cells are joined to one another by heating and applying a pressure to the polymer. First and second terminals are extended out of the polymer, the first and second terminals being connected to the first and second battery cells.

A battery manufacturing method comprises forming at least one battery cell on a support, the battery cell comprising at least a pair of electrodes about an electrolyte. The battery cell is coated with a conformal coating of a polymer. A cover is laminated onto the polymer. A portion of the polymer is removed to expose first and second terminals that are connected to the first and second battery cells.

A battery manufacturing method comprises forming a battery cell on a support. The battery cell is covered with polymer. A cover is positioned over the battery cell. The cover is laminated to the polymer by heating and applying a pressure to the battery while maintaining the battery in a vacuum. First and second terminals are connected to the battery cell.

A pressure-applying apparatus comprises a chamber comprising a vacuum tube capable of being connected to the vacuum pump, and a pressurized gas tubing capable of being connected to a pressurized gas source. A flexible sheet is attached to the chamber, the flexible sheet capable of being inflated by pressurized gas from the pressurized gas source. A pedestal is provided to support a battery in the chamber. A heater is positioned to heat the battery on the pedestal.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

Figure 9:
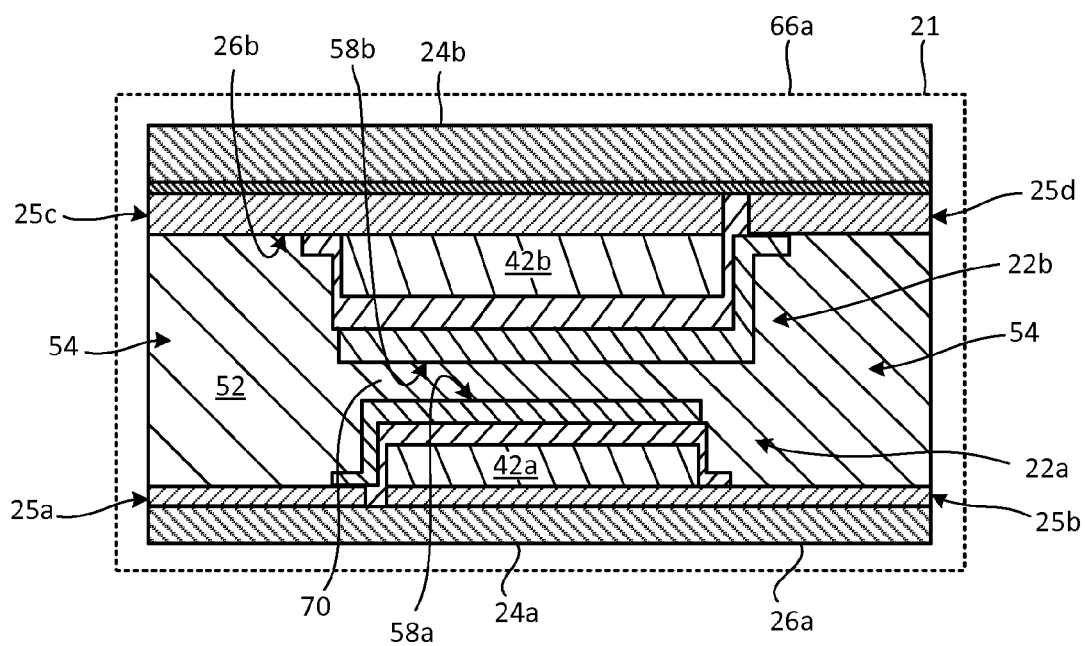
Figure 10:
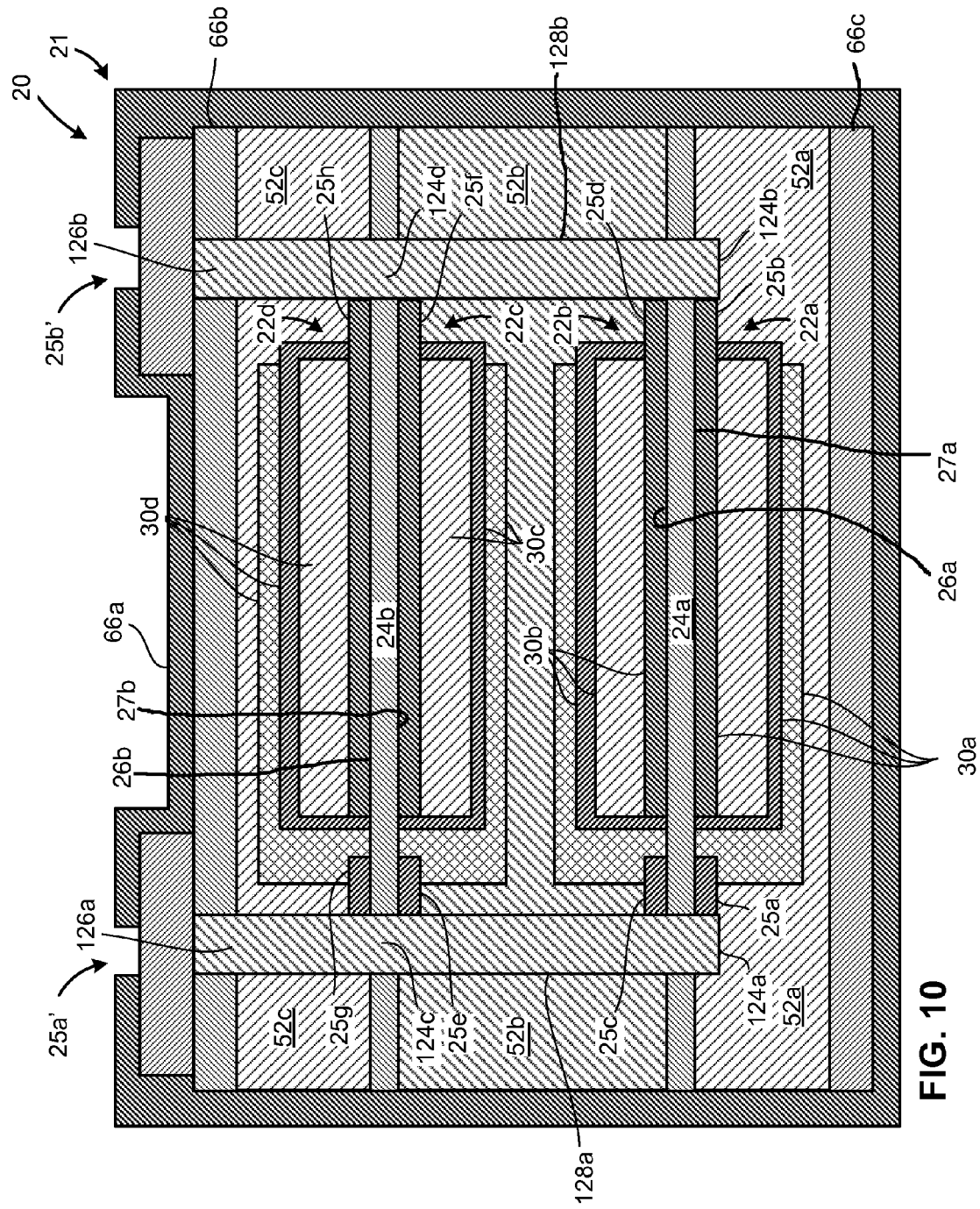

FIG. 9 is a cross-sectional view of another embodiment of a stacked battery having battery cells on the inside surfaces of a pair of supports with the battery cells facing one another and covered with polymer; and FIG. 10 is a cross-sectional view of another embodiment of a stacked battery having battery cells on the top and bottom surfaces of a support, a surrounding protective shell, terminals, and exposed contact areas.

DESCRIPTION

Fabrication of an exemplary embodiment of a lithium battery 20 comprising a protective casing 21 surrounding at least one battery cell 22 on a support 24 is shown in FIGS. 1A to 1D. The protective casing 21 protects the battery cell 22 from degradation in the external environment. The support 24 comprises a material that is impermeable, or has very low permeability, to environmental elements such as oxygen, water vapor, carbon monoxide and carbon dioxide. The support 24 should also have a relatively smooth surface and sufficient strength to support sets of battery component films 30 that form each battery cell 22, at the fabrication and operational temperatures of the battery component films. For example, the support 24 can comprise aluminum, aluminum oxide, metal foil, metalized plastic film, mica, quartz, or steel. In one version, the support 24 comprises a top surface 26 and a bottom surface 27 both of which are planar, or even flat and smooth.

Figure 2:
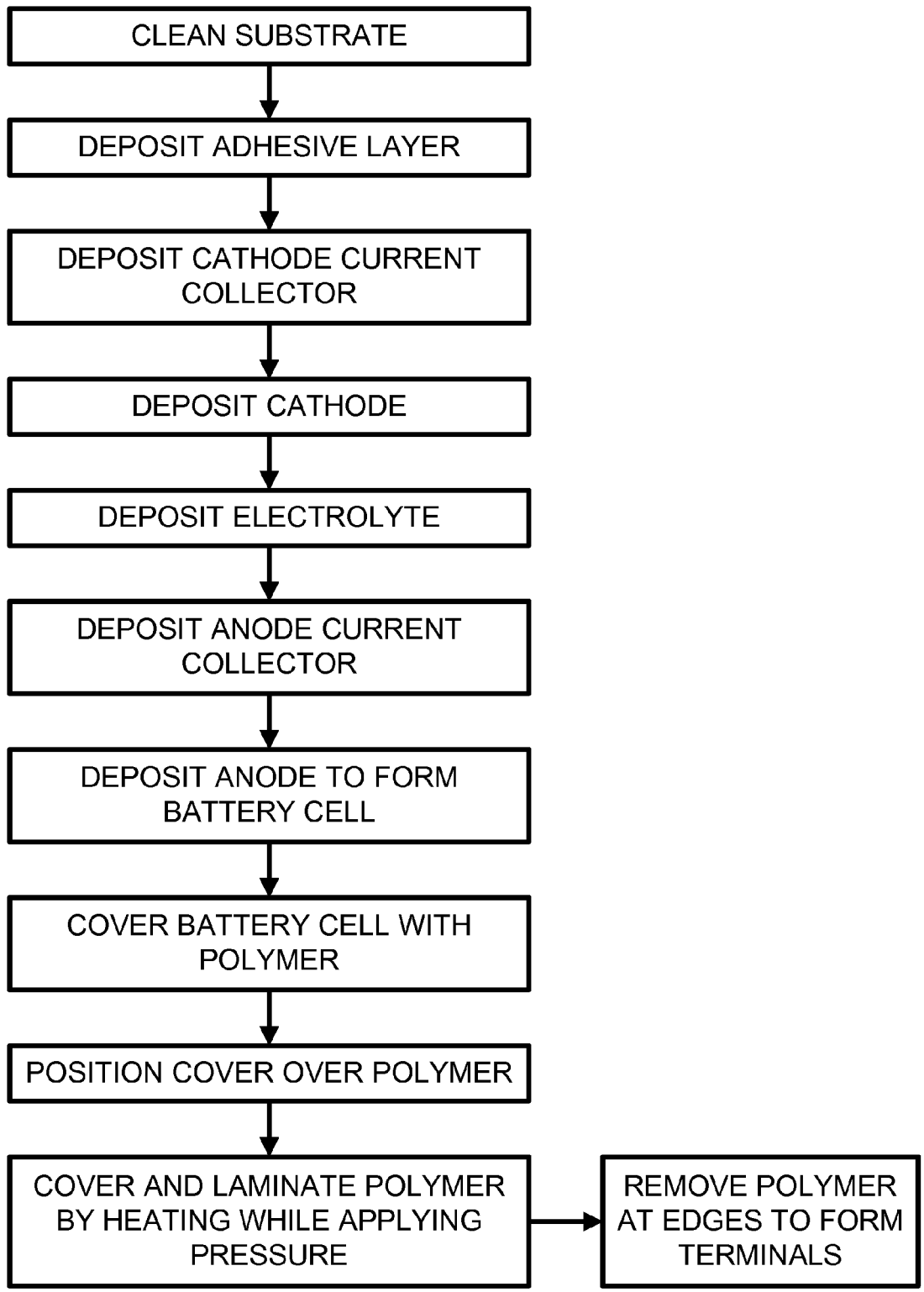
FIG. 2 is a flowchart illustrating an exemplary process of forming the battery cell of FIGS. 1A to 1D.

An exemplary process of fabricating one or more battery cells 22 of a battery 20 on a top or bottom surface 26, 27, respectively, of a support 24 is illustrated with reference to FIG. 2. While an exemplary embodiment of the structure of a battery cell 22 and a process of manufacturing the cell is described, it should be understood that other battery structures or fabrication processes as would be apparent to one of ordinary skill in the art are within the scope of the present invention. For example, the fabrication process described herein can include processes of forming a battery cell 22 which are found in, for example, commonly assigned U.S. patent application Ser. No. 12/032,997, entitled "LITHIUM BATTERY FABRICATION USING LASER SHAPING" to Nieh et al., filed on Feb. 18, 2008; and U.S. Pat. No. 6,921,464; U.S. Pat. No. 6,632,563, U.S. Pat. No. 6,863,699, and U.S. Pat. No. 7,186,479; all of which are incorporated by reference herein and in their entireties.

Figure 1A:
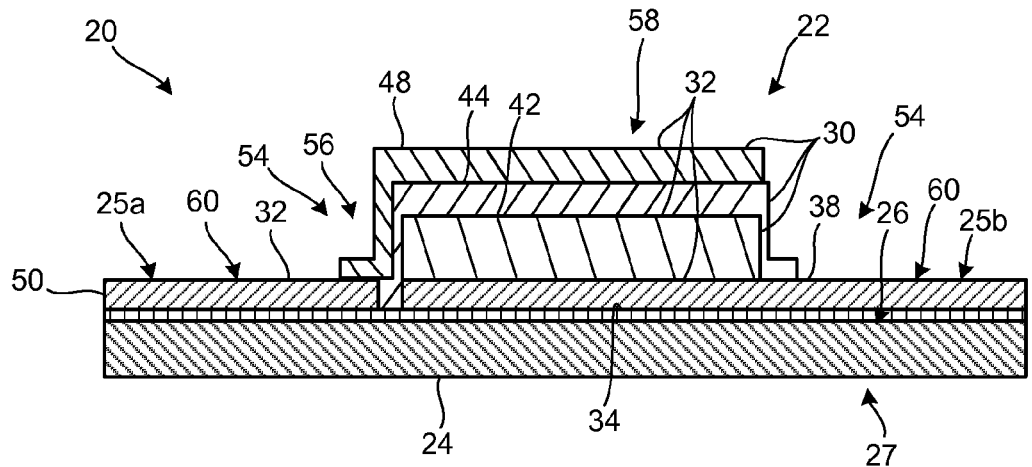
FIG. 1A is a sectional side view of an exemplary embodiment of a battery comprising a battery cell on a support.

Referring to FIG. 1A, the top and bottom surfaces 26, 27 of the support 24 are cleaned to remove surface contaminants to obtain good adherence of subsequently deposited films. For example, the support 24 can be cleaned by an annealing process in which the support 24 is heated to temperatures sufficiently high to clean the surface by burning-off contaminants and impurities, such as organic materials, water, dust, and other materials deposited on the surfaces 26, 27. The support 24 can also be heated to temperatures sufficiently high to remove water of crystallization present in the support material. The annealing temperatures and/or water of crystallization removal temperatures can be, for example, from about 150 to about 600° C., or even at least about 540° C. The annealing process can be conducted in an oxygen-containing gas, such as oxygen or air, or other gas environments, for about 10 to about 120 minutes, for example, about 60 minutes.

After a suitably clean surface is obtained, a plurality of different processes is used to deposit a set of battery component films 30 on the top surface 26 of the support 24. Portions of some of the deposited battery component films 30 form electrodes 32 as well as the terminals 25a,b of each of the battery cells 22. Each battery cell 22 comprises a set of battery component films 30 that operate to generate and store electrical energy. In one exemplary embodiment, the battery component films 30 can include, for example, an adhesion layer 34, cathode current collector 38, cathode 42, electrolyte 44, anode 48, and anode current collector 50. In a minimal configuration, a battery cell 22 comprises an electrolyte 44 that is sandwiched between at least a pair of electrodes 32, which can include any one or more of a cathode current collector 38, cathode 42, anode 48, and anode current collector 50. The electrodes 32 collect electrons which are released from one electrolyte surface when ions travel through the electrolyte 44, and return electrons to the other surface of the electrolyte 44.

The adhesion layer is deposited on the top surface 26 of the support 24 to improve adhesion of overlying battery component films 30. The adhesion layer 34 can comprise a metal or metal compound, such as for example, aluminum, cobalt, titanium, other metals, or their alloys or compounds thereof; or a ceramic oxide such as, for example, lithium cobalt oxide. When the adhesion layer 34 is fabricated from titanium, the titanium film is deposited in a sputtering chamber with, for example, the following process conditions: argon at a pressure of 2 mTorr; DC (direct current) sputtering plasma set at a power level of 1 kW, deposition time of 30 seconds, titanium target size of 5×20 inches, and target to support distance of 10 cm. To form batteries 20 on both sides of the support, a second adhesion layer (not shown) can be deposited on the bottom surface 27, and a second battery cell 22 built on this surface. The adhesion layer 34 is deposited to a thickness of from about 100 to about 1500 angstroms.

A cathode current collector 38 is formed on the adhesion layer 34 to collect the electrons during charge and discharge process. The cathode current collector 38 is typically a conductor and can be composed of a metal, such as aluminum, platinum, silver or gold. The current collector 38 may also comprise the same metal as the adhesion layer 34 provided in a thickness that is sufficiently high to provide the desired electrical conductivity. A suitable thickness for the current collector 38 is from about 0.05 microns to about 2 microns. In one version, the current collector 38 comprises platinum in a thickness of about 0.2 microns. The current collector 38 can be formed by deposition of platinum by DC magnetron sputtering. The sputtering conditions for depositing a platinum film from a platinum target uses sputtering gas comprising argon at a gas pressure of 5 mTorr to form a DC plasma at a power level of 40 W for 10 minutes.

A cathode 42 comprising a lithium-containing material is formed over the current collector 38. In one version, the cathode 42 is composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide. Other types of cathodes 42 that may be used comprise amorphous vanadium pentoxide, crystalline $V_2O_5$ or $TiS_2$. The cathode can be deposited as a single film or as a stack of films, with alternate deposition and annealing steps. Typically, the cathode stack has a thickness of at least about 5 microns, or even at least about 10 microns. The cathode 42 can be annealed to reduce stress in the film at a temperature of from about 200 to about 500° C. The cathode 42 can also be annealed in a defect reducing step to temperatures from about 150 to about 700° C., for example, about 540° C., to further improve the a quality of the cathode 42 by reducing the amount of defects.

An electrolyte 44 also comprising a lithium-containing material is formed over the cathode 42. The electrolyte 44 can be, for example, an amorphous lithium phosphorus oxynitride film, also known as a LiPON film. In one embodiment, the LiPON has the stoichiometric form $Li_xPO_yN_z$ in an x:y:z ratio of about 2.9:3.3:0.46. In one version, the electrolyte 44 has a thickness of from about 0.1 microns to about 5 microns. This thickness is suitably large to provide sufficiently high ionic conductivity and suitably small to reduce ionic pathways to minimize electrical resistance and reduce stress.

An anode 48 is formed on the electrolyte 44, and the anode 48 can be the same material as the cathode, as already described. A suitable thickness is from about 0.1 microns to about 20 microns. In one version, anode 48 is made from lithium which is also sufficiently conductive to serve as the anode current collector 50, and in this version, the anode 48 and anode current collector 50 are made of the same material. In still another version, the anode current collector 50 is deposited onto the electrolyte 44, and the anode 48 is deposited such that extends over the electrolyte 44 and onto a portion of the anode current collector 50. In this version, the anode current collector is the same material as the cathode current collector 38 to provide a conducting surface from which electrons may be dissipated or collected from the anode 48. For example, in one version, the anode current collector 50 comprises a non-reactive metal such as silver, gold, platinum, in a thickness of from about 0.05 microns to about 5 microns. In the version shown, an anode current collector 50 is selectively deposited onto a region of the electrolyte 44. The anode 48 is then deposited onto the electrolyte 44 and part of the anode current collector 50.

The battery cell 22 comprising a plurality of battery component films 30, and/or the support 24, can also be shaped to form shaped features, for example, removing portions of the battery component films 30. The shaping processes can be performed before or after the battery component films 30 are deposited on the support 24, for example after deposition of the cathode 42 and electrolyte 44, to shape one or both of these films, such as by etching away the edge portions 77 (FIG. 1B) or forming holes for the terminals 25a,b. Suitable shaping processes include pulsed laser, etching, another such processes, and these processes can be used to form the shapes of the battery component films 30 shown in FIG. 1A.

After fabrication of the battery cell 22, a polymer 52 is applied in a conformal layer to cover the battery cell 22 and form a portion of the protective casing 21 of the battery 20. The polymer 52 comprises a relatively soft and conformal material which can fill out the gaps and uneven heights of the profile of the top surface 58 of the battery cell 22. As shown, the polymer 52 conforms to the depressions and protrusions of the exterior surface to also flatten and planarize the battery cell 22. As shown by the solid line in FIG. 1B, the polymer 52 is applied to cover a top surface 58 of the battery cell 22 as well as the side perimeter surfaces 54 of the battery cell 22, and even extending to cover the peripheral edge 60 of the battery 20. The side perimeter surfaces 54 are those surfaces which are vertical to the top surface 26 of the support 24 and extend around the perimeter 56 of the battery cell 22. When dip coated, as described below, the polymer 52 can also cover the bottom surface 27 of the support 24. However, it is not necessary for the polymer 52 to cover the bottom surface 27 of the support 24 as the support structure is generally sufficiently impervious to the passage of gases or vapors from the external environment therethrough. In one version, the polymer 52 comprises a thickness of less than 60 microns, for example, from about 20 to about 50 microns.

The polymer 52 can include a thermoset or thermoplastic polymer, or an epoxy. For example, polymer 52 can be a halogenated polymer such as a chloro-polymer or fluoropolymer. Suitable polymers 52 include polytetrafluoroethylene, polytetrachloroethylene, perfluoroalkoxy polymer resin, perchloroalkoxy polymer resin and/or fluorinated or chlorinated ethylene-propylenes, polyethylenetetrafluoroethylene, polyethylenetetrachloroethylene polyvinylfluoride, polyvinylchloride, polyethylenechlorotrifluoroethylene, polyvinylidene chloride or fluoride, polychlorotrifluoro ethylene, or can even be other polymers such as parylene that can be deposited using vacuum deposition technology. The polymer is, in one version, polyvinylidene dichloride (PVDC) or polyvinylidene difluoride (PVDF) or polyurethane. PVDF has a relatively low density (1.78) and low cost compared to the other fluoropolymers, and is sold under the tradename Kynar™ by Arkema, Inc. of Philadelphia, Pa.

In one version, the polymer 52 comprises polyvinylidene chloride polymer (PVDC). Advantageously, PVDC polymer provides a relatively soft and conformal coating which provides better resistance to diffusion of gaseous ions through the polymer. For example, the PVDC polymer can have a water vapor permeability <0.1 g*mm/($m^2$*day); and an oxygen and nitrogen permeability <0.1 ($cm^3$*mm)/($m^2$*day). These properties make PVDC a very effective barrier layer to protect the battery components. The PVDC polymer forms a conformal coating that serves as a passivating coating to passivate the underlying battery component films 30, especially the lithium containing films, and protect them from the external environment. The PVDC polymer can be, for example, IXAN® SGA-1 PVDC resin, available from Solvay Plastics, Belgium.

Figure 3:
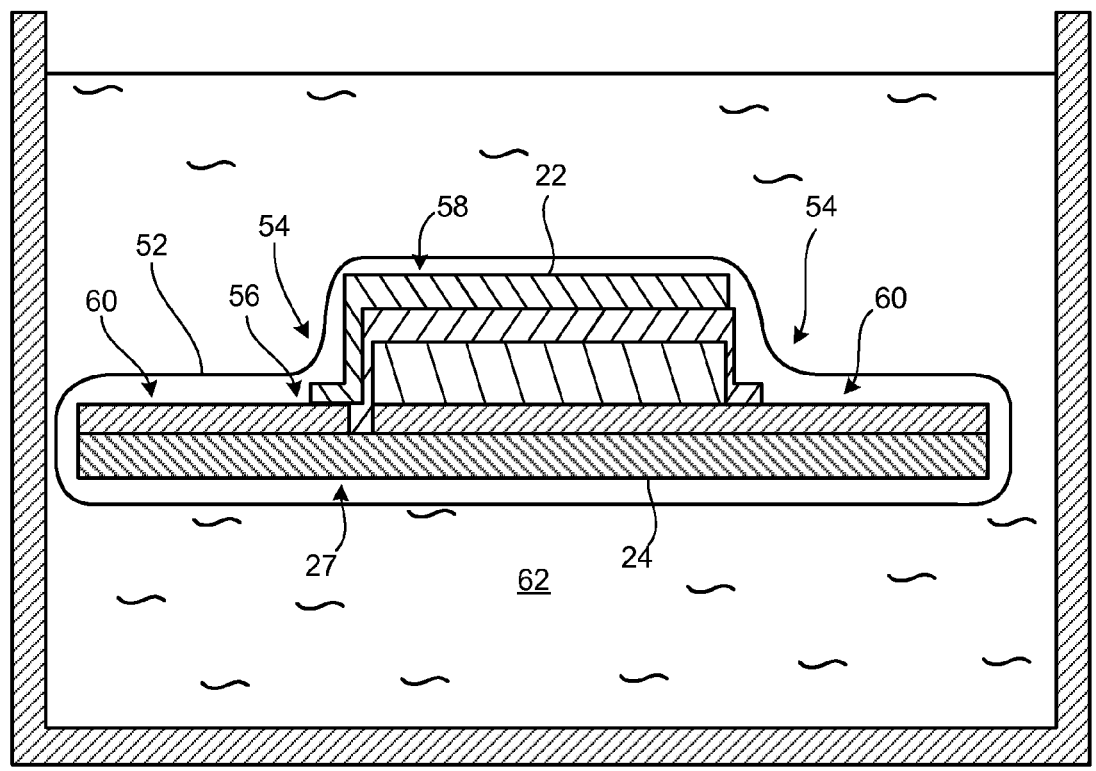
FIG. 3 is a sectional side view of a battery comprising a battery cell on a support being dip coated with polymer in a dip coating tank.

In one version, the polymer 52 is applied as a liquid, for example, a solution, which covers and surrounds the battery cell 22 and extends to beyond the perimeter 56 of the battery cell 22. In an exemplary method, the polymer 52 is applied by dip coating the prefabricated battery cell 22 on a support 24 in a polymer solution 62, as shown in FIG. 3. The entire battery cell 22 can be dip coated as shown, and thereafter, the bottom surface 27 of the support 24 cleaned off. Alternatively, the battery cell 22 can be inverted and the top surface 58 of the battery cell 22 dipped into the polymer solution 62 to coat the battery cell 22 with polymer solution 62 to form a layer comprising the polymer 52 as shown schematically in FIG. 3. The polymer solution 62 can be, for example, a polymer or copolymer dissolved in a solvent, such as PVDC dissolved in ketones, or esters. In one version, PVDC resin powder is dissolved in Methyl Ethyl Ketone (MEK) in a concentration of from about 5% weight to about 50% weight, or even from about 10% weight to about 20% weight. The dip coating process is performed at room temperature or other temperatures as appropriate for the specific polymer solution 62.

Figure 1B:
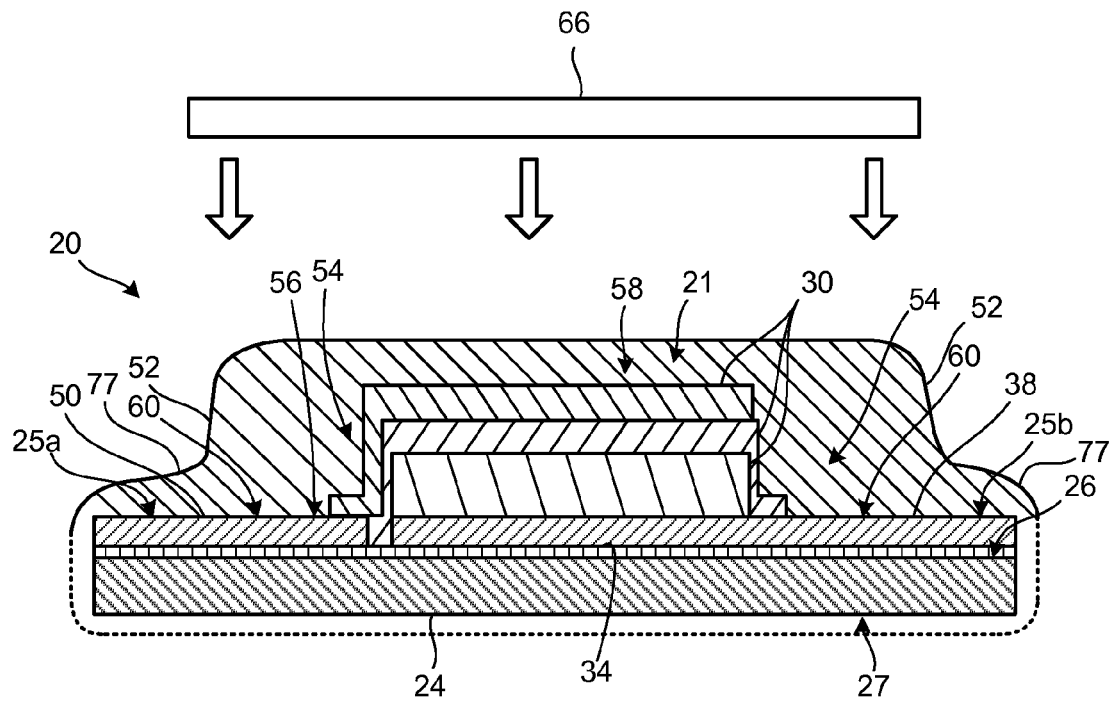
FIG. 1B is a sectional side view of the battery of FIG. 1A, showing a cover about to be positioned over a layer of polymer which covers the battery cell.

While a dip coating process is illustrated as an exemplary embodiment, other liquid coating processes can also be used. For example, polymer can be sprayed onto the top surface 58 and side perimeter surface 54 of each battery cell 22, and even extend to the peripheral edge 60 of the battery 20 encompassing one or more battery cells 22. The polymer 52 can also be formed from a polymer solution 62 using a polymer dispenser, or by screen or stencil printing. After coating with the polymer solution 62, the polymer coated battery cell 22 or battery 20 is allow to dry, to evaporate any remaining solvents in the polymer solution 62 to form a layer of the polymer 52 as shown in FIG. 1B. The drying time depends on the solvent and ambient drying temperature but is generally about 10 minutes at room temperature.

The polymer 52 can also be applied as a thin solid film which covers and surrounds the battery cell 22 to the perimeter 56 of the battery cell 22. In this version, the polymer 52 is in the form of a prefabricated polymer film which is cut to shape and applied around the battery cell 22 as shown in the solid line (excluding the dashed line section) in FIG. 1B. A suitable polymer film comprises PVDC polymer as described above. The polymer film is cut to a predefined shape and placed around the battery cell 22. For example, when the battery cell 22 has a rectangle shape, the polymer film can be cut to form a rectangle with a rectangular perimeter, the rectangle sized to cover the top surface 58 and side surfaces 54 of the battery cell 22, and extend across the perimeter 56 of the cell up to the peripheral edge 60 of the battery 20 itself.

In one version, after the polymer 52 is in place to cover the one or more battery cells of a battery 20, a cover 66 which forms another portion of the protective casing 21, is positioned on top of the polymer 52 covering the battery cell 22 as shown in FIG. 1B. The cover 66 is spaced apart from and covers the battery cell 22 to form a gap 70 having a gap distance 72 which is filled with polymer 52. In one version, the cover 66 has a thickness of less than 50 microns, for example, from about 7 to about 40 microns.

In the version shown, the cover 66 is a rigid plate of a ceramic material, such as aluminum oxide. The rigid plate provides a battery 20 having a fixed height which allows stacking of a battery 20 with other similar batteries. Advantageously, the fixed height of the battery 20 having a rigid cover plate allows more reproducible design specifications for the battery and design of devices that utilize the battery.

The cover 66 can also be made from a flexible film, including one or more of ceramic, glass, metal and polymer films. The flexible cover 66 reduces the space occupied by the battery 20 which can increase its energy density. In certain applications, the higher energy density is more important than having a battery with a fixed height. In one version, the flexible cover 66 comprises a metal foil or metal coated plastic film.

In still another version, the cover 66 comprises a plurality of ceramic and polymer films that is conformal to the shape of the battery. The film materials can be made to alternate with one another so that a ceramic film is separated from another ceramic film by a polymer film or vice versa. The thickness of each of the ceramic or polymer films can be less than about 1000 angstroms, or even from about 10 to about 1000 angstroms. A suitable composition of the ceramic comprises aluminum oxide or diamond-like carbon (DLC), and a suitable composition of the polymer comprises polymer, epoxy, or even a thermoset or thermoplastic polymer.

In yet a further version, the cover 66 is made from the same material as the support 24. For example, the support 24 and cover 66 can each comprise a substrate having cleavage planes, such as mica, these materials can easily be made into thin sheets by splitting the material along the cleavage planes and provide excellent barriers to external gases and liquids in the direction normal to the cleavage plane of support 24 and cover 66 even when the support and cover are only several microns thick.

Figure 1C:
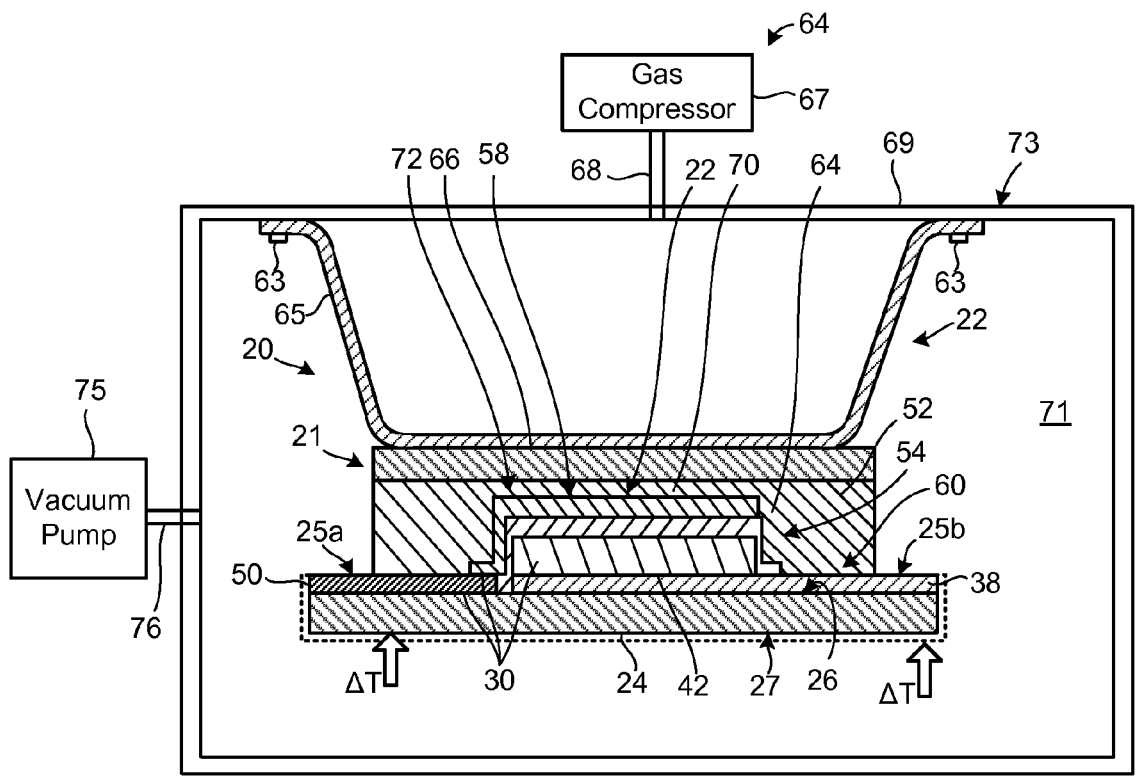
FIG. 1C is a sectional side view of the battery of FIG. 1B showing lamination of the cover and polymer to form a protective casing of the battery.

The cover 66 can be shaped and sized so that parts of the cathode current collector 38 and the anode current collector 50 extend beyond the area covered by the cover 66 to be eventually exposed as the terminals 25a,b, as shown in FIGS. 1B and 1C. After placing the cover 66 with the proper alignment, pressure is applied to press the cover 66 and the support 24 together to squeeze the polymer 52 therebetween. In one version, the pressure is sufficiently low to maintain a gap 70 with a gap distance 72 between the cover 66 and the top surface 26 of the battery cell 22 that is at least about 5 microns, or even from about 10 microns to 50 microns. While both the top surface 26 and the side perimeter surfaces 54 of the battery cell 22 are enclosed by polymer 52, the polymer 52 has some level of permeability and does not have the low permeability of the cover 66 or support 24. Thus, the gap distance 72 is to be sufficiently small that the resultant thickness or width of the polymer 52 is also sufficiently small to reduce permeation of harmful gases from the environment into the battery cell 22.

In one version, a pressure is applied to the cover 66 using a pressure-applying apparatus 64 as shown in FIG. 1C. In the version shown, the pressure-applying apparatus 64 comprises a flexible sheet 65 attached to a chamber 73. The flexible sheet 65 can for example be attached to a pressure plate 69 via fasteners 63, where the pressure plate 69 serves as a ceiling (as shown) or a sidewall of the chamber 73. The flexible sheet inflates when a pressurized gas source 67 provides pressurized gas through the pressurized gas tubing 68 to reach the backside of the flexible sheet 65. The flexible sheet 65 is attached at its ends by the fasteners 63 such that when it is inflated by the pressurized gas from the pressurized gas source 67, the flexible sheet 65 stretches and pushes against the cover 66 of the partially fabricated battery 20. The pressure plate 69 to which the flexible sheet 65 is attached can be mounted on a wall of a chamber 73 (as shown) or can be a free-standing structure in the chamber 73 (not shown). The pressurized gas source 67 can be a canister of compressed gas, such as a canister of an inert gas, for example argon or nitrogen; or a compressor to compress a gas such as air. The pressurized gas source 67 is capable of providing gas at a pressure of at least about 3 psi, or even from about 3 to about 60 psi, for example about 10 psi. The gas can be air or an inert gas, such as argon or nitrogen.

In another embodiment, the pressure-applying apparatus 64 can also be a weight applied on top of the cover 66 such as a metal plate weighing from about 10 lb to about 100 lb. In still other versions, the pressure-applying apparatus 64 can also be a press, such as a ram-press, or an isostatic press. The pressure-applying apparatus 64 can also be a clamp that exerts pressure on the cover 66. In yet another version, the weight of the cover 66 provides a sufficient pressure and no additional pressure-applying apparatus 64 is needed.

A vacuum can also be pulled on the partially fabricated battery 20 using a vacuum pump 75 which is connected to the enclosed space of the chamber 73 by a vacuum tube line 76. The vacuum pump 75 sucks out the gases and vapor present in the chamber 73 to form a better laminate of the cover 66, polymer 52 and underlying support 24. Applying a vacuum also reduces the possibility of trapping air within the battery structure which would cause deterioration of the lithium containing battery component films. A suitable vacuum comprises a pressure of from about 10 mTorr to about 10 Torr.

While the pressure is being applied, the partially fabricated battery 20 is also heated to cure or to soften the polymer 52. Depending on the type of the polymer material, a suitable curing or softening temperature can be at least about 40° C., or even from about 50 to about 110° C. The partially fabricated battery 20 can be heated by a heater 71 such as a hot plate, radiant heater, or even a heat gun. Alternatively, the whole chamber 73 can be placed in an oven. The applied pressure and temperature laminates the polymer 52, cover 66, battery cell 22 and support 24 to each another by curing thermal set polymer or reflow of thermoplastic polymer 52. The curing or reflow process can be performed in the chamber 73 while applying a positive pressure to the cover 66 by the flexible sheet. For a polymer 52 such as PVDC, the pressure and temperature is applied for about 30 seconds, or even from about 5 to about 60 seconds.

After curing of thermoset polymer or reflow of thermoplastic polymer, the edge portions 77 of the polymer 52 overlying the sections of the cathode current collector 38 and anode current collector 50 that extend beyond the peripheral edge of the battery 20 are peeled off to expose underlying material that serves as the first and second terminals 25a,b, respectively, as shown in FIG. 1C. The first and second terminals 25a,b are connected to different electrodes 32 of the battery cell 22 and extend out of the protective casing 21 for connecting the battery cell 22 to the external environment. In the example shown, the first terminal 25a is connected to the anode current collector 50 and the second terminal 25b is connected to the cathode current collector 38. The anode 48 connects the anode current collector 50 of the electrolyte 44, and the cathode 42 connects the cathode current collector 38 to the electronic 44.

The protective casing 21 around the battery cell 22 formed by the support 24 and cover 66 and the polymer 52 cooperate to create a protective barrier that seals off the top and bottom surfaces 26, 27 and the side perimeter surfaces 54 of the battery cell 22 from the external environment. More specifically, the support 24 and cover 66 serve as a gas or vapor barrier to seal off the top and bottom surfaces 26, 27, respectively. The polymer 52 further reduces ingress of gases by sealing off the side perimeter surfaces 54 that surround the perimeter 56 of the battery cell 22 from the external environment. The resultant protective casing 21 comprising the support 24, polymer 52, and cover 66 allow storage of the battery 20 without excessive degradation of the battery component films 30 of the battery cell 22.

Figure 1D:
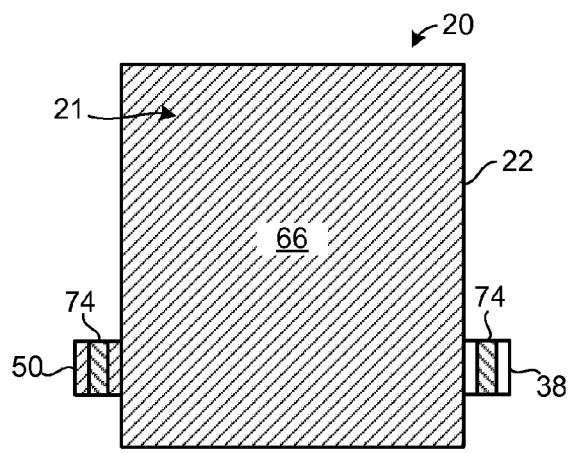
FIG. 1D is a top plan view of the battery after the battery is cut out from the underlying support.

In the next step, one or more battery cells 22 are cut out of a support 24 on which a plurality of batteries 20 or battery cells 22 are fabricated. For example, a cut-out battery 20 comprising a single battery cell 22 covered by a cover 66, is shown in FIG. 1D. Shadow masks 74 can be provided prior to cutting out the battery 20, for example, the shadow masks 74 can be placed on the portions of the anode current collector 50 and the cathode current collector 38 that extend outside the protective casing 21 by the support 24, cover 66 and polymer 52. The shadow mask 74 can be a mechanical mask or a polymer deposition mask.

A suitable battery cutting process for cutting out a battery 20 can include laser or mechanical cutting. Laser cutting can be performed using a pulsed laser process. In one exemplary embodiment, the laser source is a femtosecond laser comprising a diode—pumped solid-state laser with a lasing medium comprising a rod of titanium doped sapphire. In another exemplary embodiment, the pulsed laser source is be an ultraviolet laser such as an excimer or 'excited dimer' laser, which is a chemical laser that uses a combination of an inert gas, such as argon, krypton, or xenon; and a reactive gas such as fluorine or chlorine, to generate a laser beam. Other laser sources can also be used, as would be apparent to one of ordinary skill. Several exemplary laser source and cutting methods are described in co-pending U.S. patent application Ser. No. 11/796,487 to Li et al. and co-pending U.S. patent application Ser. No. 12/032,997 to Nieh et al., both of which are incorporated by reference herein and in their entireties.

Figure 4A:
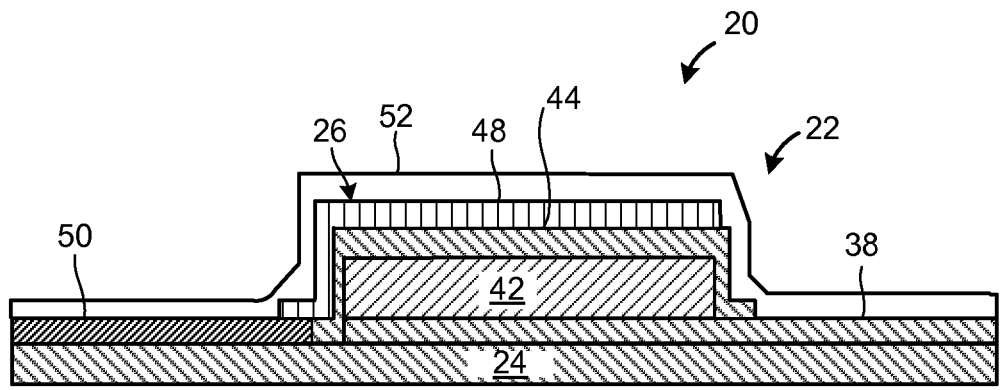
FIG. 4A is a sectional side view of another embodiment of battery cell on a substrate covered by dip-coated polymer.
Figure 4B:
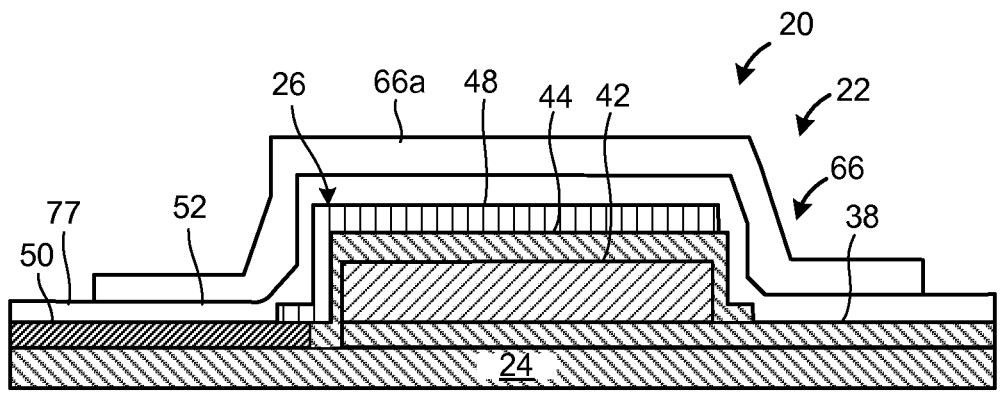
FIG. 4B is a sectional side view of the battery of FIG. 4A showing lamination of a conformal cover comprising a metal coated plastic film on the battery cell to form a protective casing.
Figure 4C:
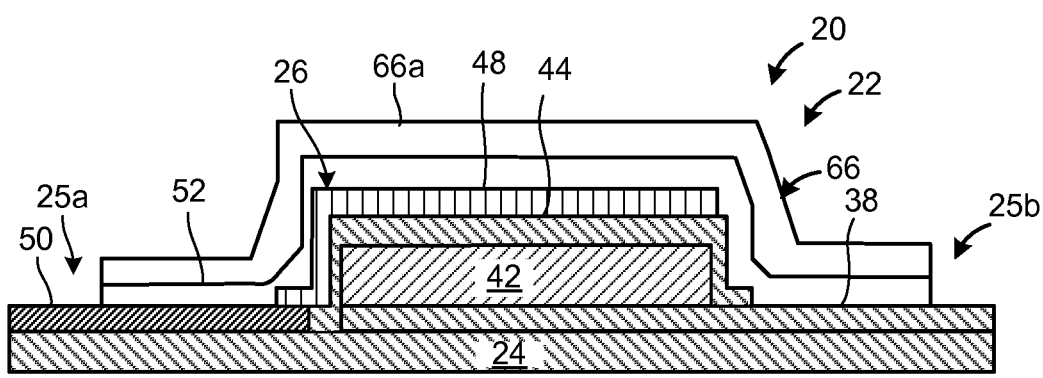
FIG. 4C is sectional side view of the battery of FIG. 4B after removal of the polymer at edge of the battery to form the first and second terminals of the battery.

Another version of a battery 20 comprising a protective casing 21 that includes a conformal layer of polymer 52 laminated to a cover 66 comprising a conformal cover 66a that is conformal to the battery structure, as shown in FIGS. 4A to 4C. (Note: the cover 66 is usually not conformal to the battery surface. The cover is flexible, it become conformal to the battery surface morphology after the lamination process.) The conformal cover 66a follows the contour or shape of the battery 20 comprising a single or plurality of battery cells 22. In one version, the conformal cover 66a comprises a metal film, a flexible ceramic film such as mica, or a metalized polymer film. The metal film can be an aluminum, copper, titanium, or nickel film. The polymer can include a thermoset or thermoplastic polymer, epoxy, polyurethane, or even PVDC or PVDF. For example, a suitable metal film comprises an aluminum foil having a thickness of from about 5 μm to about 20 μm, and fabricated by Arnold magnetic technologies corp, IL, USA. A suitable metalized polymer film comprises a PVDC polymer film coated on one side or both sides with aluminum. The thickness of the metalized polymer film is from about 10 μm to about 50 μm.

In this version, a conformal layer of polymer 52 is formed to cover the battery cell 22 as shown in FIG. 4A. The conformal polymer 52 can be fabricated, for example, by dip coating the battery 20 into a solution of polymer and drying the battery coated with the polymer to evaporate the solvent in the polymer solution, as described above. A conformal cover 66a is cut to a shape and size that is suitable for covering the battery cell(s) 22 from a sheet or roll of the desired film, as shown in FIG. 4B. The conformal cover 66a is placed on top of dried or cured polymer 52, and the resultant structure laminated using a vacuum process with applied pressure and temperature, as described above. Thereafter, the edge portions 77 of the polymer 52 are removed to expose the underlying anode current collector 50 or cathode current collector 38 to form the first and second terminals 25a,b, respectively, as shown in FIG. 4C. The resultant structure comprises a conformal cover 66a laminated onto the polymer 52.

Figure 5:
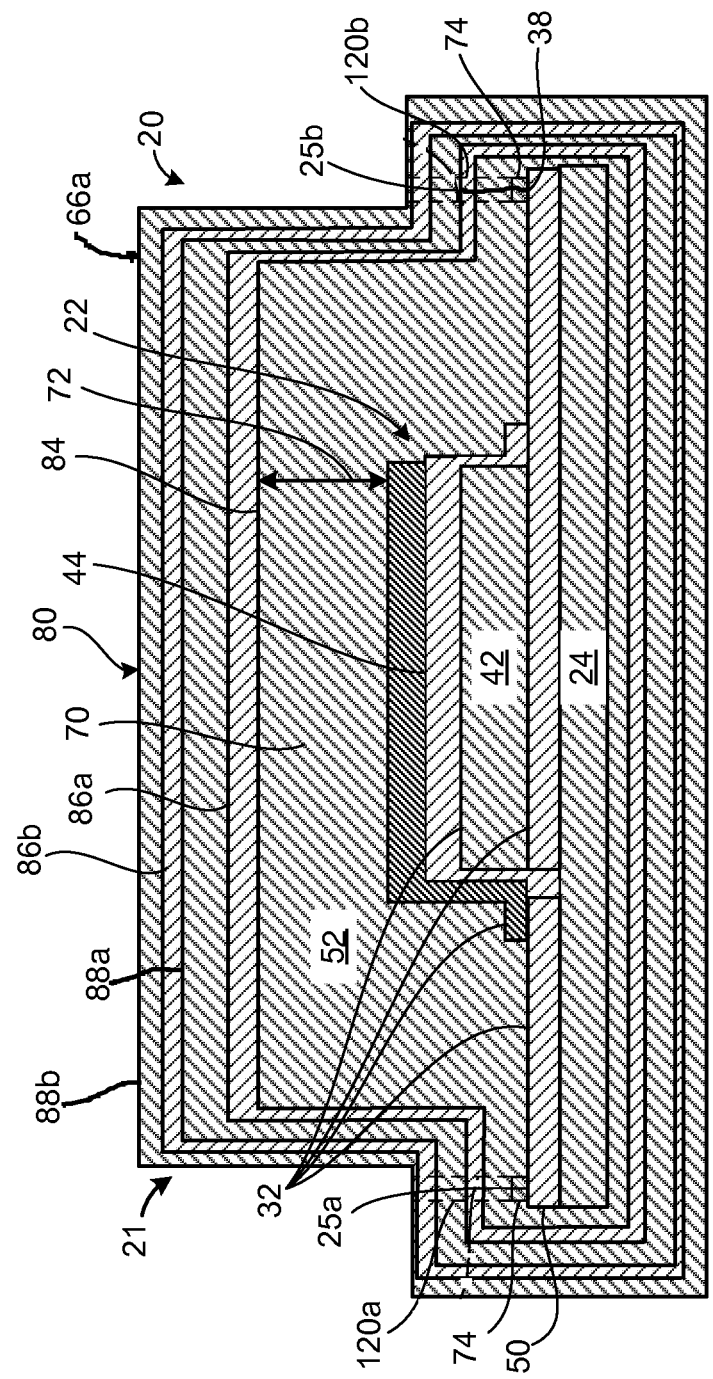
FIG. 5 is a sectional side view of another embodiment of a battery comprising a battery cell covered by a conformal layer of polymer, and having a conformal cover comprising multiple, alternating, polymer and ceramic coatings.

Still another version of a battery 20 comprising a cover 66 that is a conformal cover 66a fabricated by depositing a plurality of coatings onto a battery 20 comprising one or more battery cells 22 is shown in FIG. 5. In this structure, a battery 20 comprising one or more battery cells 22 is covered with polymer 52. Thereafter, a plurality of first and second layers 86a,b and 88a,b is deposited onto at least a portion of the conformal polymer 52, such as the top surface 84 of the polymer 52, or deposited on the cover 60 or conformal cover 66a to form a protective shell. The first layers 86a,b are made from a ceramic material, for example, aluminum oxide, silicon oxide or even diamond-like carbon (DLC). In one version, a ceramic comprising DLC comprises an amorphous material consisting of glassy or fine crystallites of $sp^3$ carbon structure. The DLC layer can also comprise other elements commonly found in organic materials, such as silicon, nitrogen or hydrogen or a small amount of metal elements such as Ti, Cr, or W. The ceramic layer minimizes gas and vapor permeation and also withstands high temperatures. The ceramic materials can be deposited by PVD or CVD. In one version, the ceramic layer can be formed in a thickness of from about 0.01 to about 0.8 microns, or even about 0.05 microns.

The second layer 88a,b comprises a polymer material. The polymer material can be PVDC or a different polymer. For example, the polymer material can be a fluoropolymer such as polytetrafluoroethylene, perfluoroalkoxy polymer resin, and/or fluorinated ethylene-propylene, polyethylenetetrafluoroethylene, polyvinylfluoride, polyethylenechlorotrifluoroethylene, polyvinylidene fluoride, polychlorotrifluoro ethylene, or can be other polymers such as parylene that can be deposited using vacuum deposition technology. The polymer is, in one version, polyvinylidene difluoride (PVDF) or polyurethane. PVDF has a relatively low density (1.78) and low cost compared to the other fluoropolymers, and is sold under the tradename Kynar™ by Arkema, Inc. of Philadelphia, Pa. In one version, the polymer layer can be formed in a thickness of from about 1 to about 8 microns, or even about 5 microns.

The conformal cover 66a can be further enhanced by formation of additional layers, including for example, a third layer of ceramic or polymer formed over the first and second layers 86a,b, 88a,b, respectively, a fourth layer, or still additional layers. The number of layers and the composition of the different layers depend on the application of the battery 20.

Advantageously, the battery 20 having a conformal cover 66a comprising multiple layers of ceramic and polymer materials, provides a benefit of both classes of materials. The polymer material is flexible allowing the conformal cover 66a to flex with applied thermal or mechanical stresses. The ceramic material has a higher resistance to permeation by gases and vapors providing better protection against the external environment. Also, the ceramic material can withstand higher temperatures if the battery is exposed to higher temperatures during use, or if the battery generates higher temperatures during charge and discharge cycles.

Figure 6:
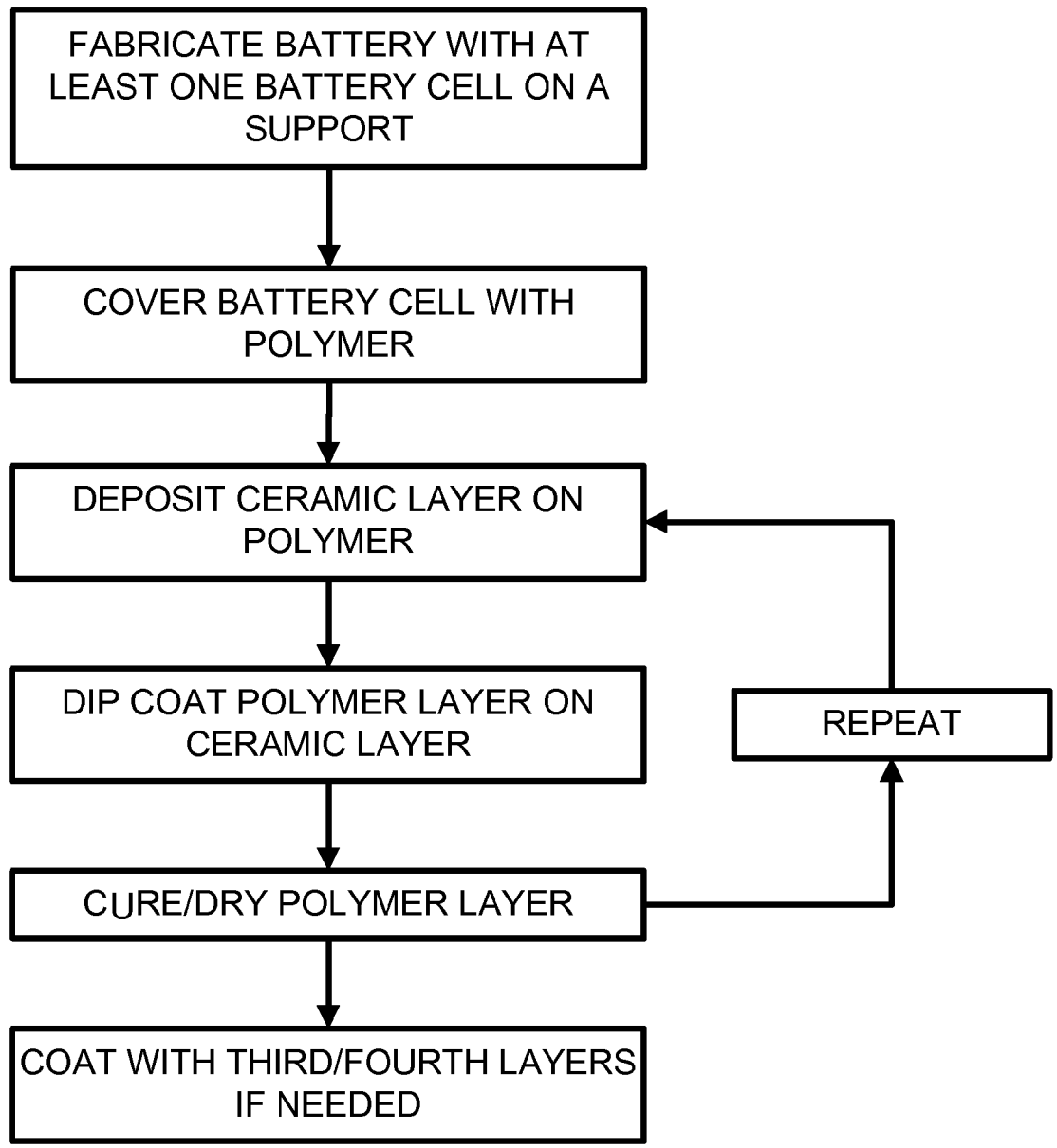
FIG. 6 is a flowchart for fabricating the battery shown in FIG. 5.

An exemplary process for fabricating this battery is shown in the flowchart of FIG. 6. Initially, a conformal coating of polymer 52 is formed to cover the battery cells 22 as described above by dip coating the partially fabricated battery 20 in a polymer solution, and thereafter drying or curing the polymer solution coated onto the battery 20. Thereafter, the conformal cover 66 comprising the first and second layers 86a,b and 88a,b, respectively, are deposited over the dried polymer 52. For example, a first layer 86a,b comprising a ceramic such as aluminum oxide can be deposited by PVD reactive sputtering of aluminum in oxygen in conventional processes known to those skilled in the art.

Figure 7:
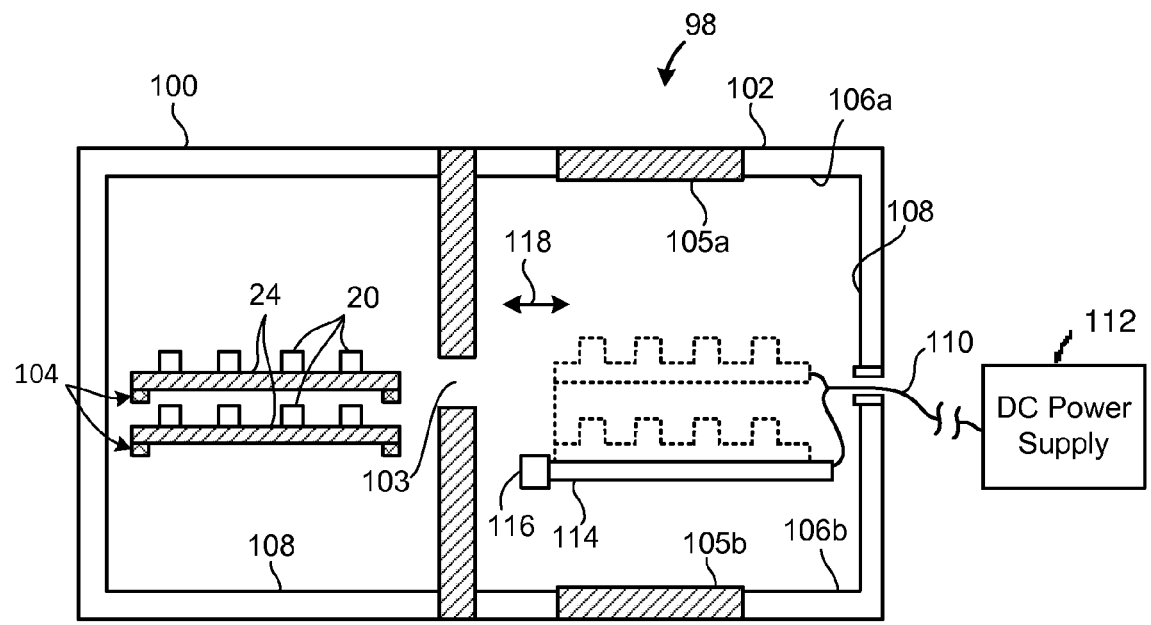
FIG. 7 is a schematic sectional side view of a vacuum deposition system for depositing a DLC layer on a battery.

Alternately, or in addition, a first layer 86a,b comprising a ceramic such as diamond-like carbon (DLC) can be deposited in a chamber by plasma enhanced chemical vapor deposition (PECVD) of a carbon-containing gas, such as acetylene, or by exciting methane gas with microwaves, using conventional processes known to those skilled in the art. In an exemplary process, a vacuum system 98 having a load lock chamber 100 and deposition chamber 102 separated by a gate valve 103, as shown in FIG. 7, can used to deposit a ceramic material such as aluminum oxide or DLC. In this process, one or more partially-fabricated batteries 20 on supports 24 are placed on a carrier 104 and loaded into a load lock chamber 100. The load lock chamber 100 is pumped down to a pressure of less than about $3\times10^{-5}$ Torr, or even less than about $2\times10^{-5}$ Torr. The deposition chamber 102 is prepared for processing by pumping down the chamber to the same pressures as the load lock chamber 100. In the exemplary chamber 102, two magnetron sputtering cathodes 105a,b are mounted on two opposing chamber walls 106a,b. The sputtering targets 105a,b can comprise a metal or carbon. Some exemplary metals are chromium, molybdenum, titanium and tungsten. In one version, the targets 105a,b comprise titanium. The two targets 105a,b can be, for example, sized 5"×20".

In the sputtering process, a pre-sputtering step is used to clean residues from the overlying sputtering targets 105a,b and chamber inner surfaces. The pre-sputtering process is conducted by providing an inert gas to the chamber 102 with a controlled flow rate and pressure and applying a power to the sputtering targets 105a,b to pre-sputter the targets for a sufficient time to clean the surface of the sputtering targets. In one embodiment, argon is provided with a flow rate of about 300±20 sccm while the chamber is maintained at a pressure of about 1.6±0.2 mTorr. A power of 2.8±0.2 kW is applied to each sputtering target 105a,b. These conditions are maintained for about 3 to 7 minutes in order to clean the surface of the sputtering targets 105a,b.

For depositing aluminum oxide, the sputtering targets 105a,b comprise aluminum, and oxygen is introduced into the chamber. For example, $O_2$ can be provided at a flow rate of about 100±10 sccm or even about 80±10 sccm, to the chamber 102. The chamber 102 is maintained at a pressure of about 5±0.2 mTorr and a power of 3±0.2 kW is applied to the sputtering targets 104.

In the deposition of DLC material, an inert gas at the same controlled flow rate and pressure as described above is provided to the chamber 102, while applying power to the sputtering targets 105a,b. In addition, after the target surfaces are clean, a reactive gas of $C_2H_2$ (acetylene) is provided at a flow rate of about 145±10 sccm or even about 175±10 sccm, to the chamber 102. The chamber 102 is maintained at a pressure of about 1.6±0.2 mTorr and a power of 2.8±0.2 kW is applied to the sputtering targets 104.

In both processes above, the carrier 104 is then transported into the process chamber 102, electrically isolated from the chamber wall 108, and connected to an electrical feed through 110 mounted on the wall 108. In an exemplary process, the carrier is held at a DC bias, relative to an inner region of the chamber wall 108, of from about −5 to about −100V. The DC bias can be either from a DC power supply 112 applying power to the carrier 104 via the electrical feed through 110 or the floating potential of the carrier in the plasma. Once the carrier 104 is moved to the middle of the two magnetron sputtering targets 105a,b, sputtered material is deposited onto the battery cell 22. The carrier 104 can further comprise a conveyor 114 having a rotating mechanism 116. The conveyor 114 moves the carrier 104 back and forth as shown by the arrow 118 between the two magnetron sputtering targets 105a,b to change the angle at which the batteries 20 on the supports 24 are exposed to the sputtering targets during deposition. The conveyor 114 and rotating mechanism 116 cooperate to ensure an even thickness of sputtered material on the top and sides of the batteries 20. The process conditions are maintained for from about 2 to about 10 minutes, for example, about 6 minutes, to for example, deposit an amorphous DLC layer with a thickness of about 0.1 microns or an aluminum oxide layer having a thickness of 0.01 microns. After deposition is complete, the carrier 104 is moved into the load lock chamber 100 and the gate valve 103 between the load lock chamber 100 and process chamber 102 is closed. The load lock chamber 100 is vented and the carrier 104 is removed. The batteries 20 on the supports 24 are removed from the carrier 104 and can be further processed.

After the multilayer conformal cover 66a is formed around the battery cell(s) 22 or battery 20, the shadow masks 74 are removed from the anode and cathode current collectors, 38, 50. This removal step also lifts off the cutout portions 120a,b of the conformal cover 66a (as shown in FIG. 5) to expose the underlying cathode and anode current collectors, 38, 50, respectively, which are used as the terminals 25a,b to connect to the battery 22. Also, while the above examples illustrate fabrication of a battery 20 comprising a single battery cell 22, the cover 66 or conformal cover 66a can also be applied to protect a battery comprising a plurality of battery cells 22, which may be arranged in a linear or stacked configuration, as for example, described in commonly assigned U.S. patent application Ser. No. 12/454,255, filed on May 13, 2009 to Shih et al., which is incorporated by reference herein and in its entirety.

Figure 8A:
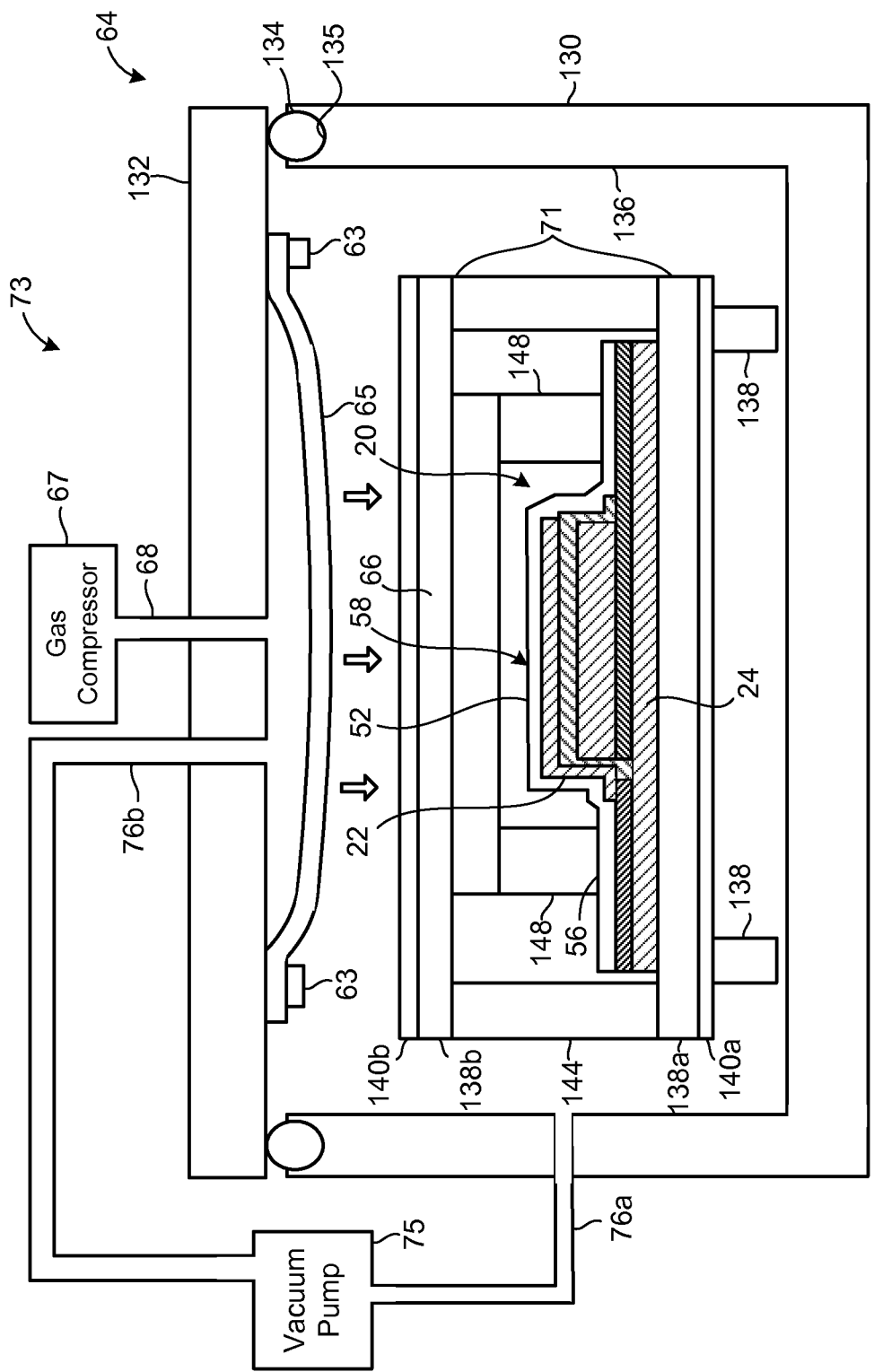
FIG. 8A is a schematic sectional side view of another version of a pressure-applying apparatus.

Another version of a pressure-applying apparatus 64 is shown in FIG. 8A. In this version, the pressure-applying apparatus 64 comprises a chamber 73 composed of a bin 130 covered by a lid 132 and with a vacuum seal 134 therebetween. For example, the vacuum seal 134 can be an O-ring seal in a groove 135 in the wall of the bin 130. The bin 130 comprises a vacuum tube 76a connected to a vacuum pump 75. The lid 132 also has a vacuum tube 76b connected to the vacuum pump 75, as well as a pressurized gas tubing 68 connected to a pressurized gas source 67, such as a gas compressor. A flexible sheet 65 can be inflated by gas from the gas compressor which compresses gas and pumps it through the pressurized gas tubing 68, the flexible sheet 65 being attached to the lid 132 by the fasteners 63. A pedestal 138 is used to support a heater 71 comprising a pair of heat diffusers 138a,b that contact a heating pad 140a,b, respectively. The heat diffusers 138a,b are separated from one another by lamination spacers 144 which can be a cylindrical or rectangular wall or a plurality of posts.

In use, a partially fabricated battery 20 comprising a battery cell 22 on a support 24, which is covered by a conformal layer of polymer 52, is placed on the pedestal 138. In addition, a perimeter wall 148 also made of polymer is positioned around the perimeter 56 of the battery 20. A cover 66 is then positioned over the perimeter wall of polymer. The vacuum pump 75 is operated to maintain a vacuum pressure of from about 10 mTorr to about 10 Torr, for example about 200 mTorr in the chamber 73. A vacuum can also be pulled on the flexible sheet 65 to maintain the flexible sheet in contact with the lid 132 of the chamber 73 in the initial stages. Thereafter, the heater 71 is turned on to maintain the environment within the chamber 73 at a temperature of from about 80 to about 120 degree C. When the desired temperature is reached, the flexible sheet 65 is inflated by pressurized gas from the pressurized gas source 67, for example, using a canister of argon at a pressure of at least about 3 psi, or even from about 3 to about 60 psi, for example about 10 psi. The flexible sheet 65 stretches and pushes against the cover 66 of the partially fabricated battery 20 while the battery 20 is maintained at temperature, and the gases in the chamber 73 are extracted by the vacuum pump 75. As result, the cover 66 is firmly adhered to the conformal layer of polymer 52 and the perimeter wall 148 of polymer, to form a cohesive laminate structure.

At least one lamination spacer 144 is placed between the pedestal 138 and the cover 66 of the battery cell 20. Advantageously, the lamination spacer 144 prevents excessive pressure being applied to the top surface 58 off the battery cell 22, to prevent damage to the battery cell 22. In addition, the lamination spacer 144 can be set to a desired height to support the cover 66 to obtain a fixed height for the resultant laminated battery 20. The height of the battery 20 depends on the number of battery cells 22, and the height increases for batteries 20 having larger number of battery cells 22 or for batteries 20 which comprise stacked supports 24 that each have one or more battery cells 22 on a single or both sides of the supports 24. The lamination spacer 144 can be a cylindrical wall, a rectangular wall, or a plurality of posts.

Figure 8B:
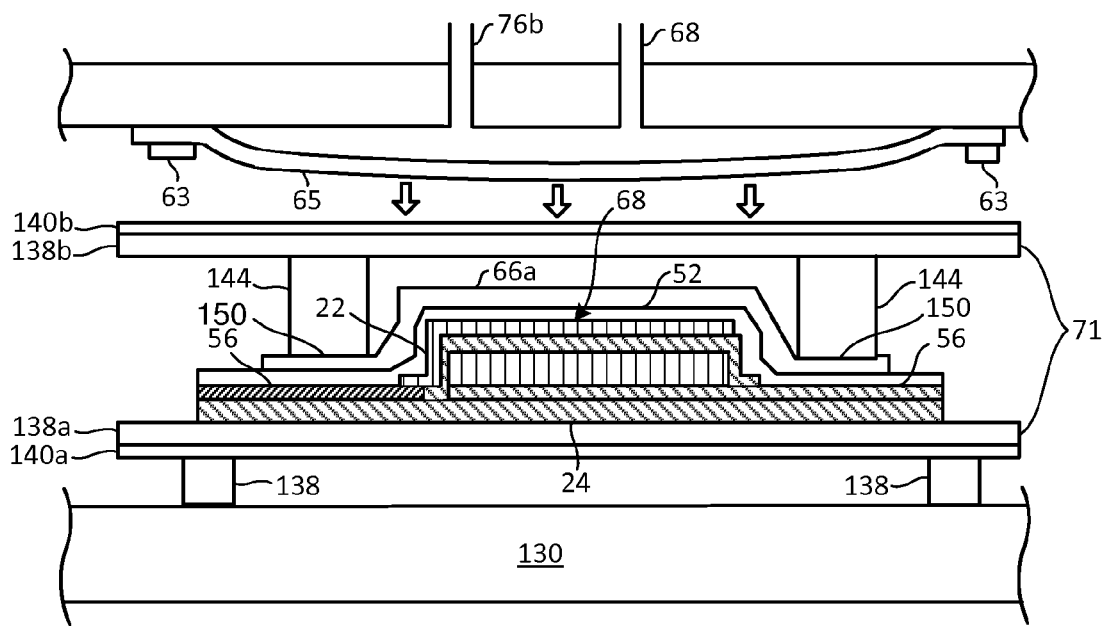
FIG. 8B is a partial schematic sectional side of the apparatus of FIG. 8A, with a different set up for laminating a conformal cover onto a battery.

The pressure-applying apparatus 64 described above can also be used to laminate a conformal cover 66a to a battery 20 as shown in FIG. 8B In this version, the lamination spacers 144, as described above, are placed on the perimeter 56 of the battery 20 and directly over a peripheral edge 150 of the conformal cover 66a. In doing so, the lamination spacers 144 are positioned to apply pressure directly to the peripheral edge 150 of the conformal cover 66a thereby firmly adhering and laminating the peripheral edge 150 of the conformal cover 66a to the underlying support 24. Again, the lamination spacers 144 can also have a desired height that prevents application of excessive pressure to the top surface 58 off the battery cell 22 to avoid damaging the battery cell.

In yet another version, a lithium battery 20 comprises a first battery cell 22a fabricated on the top surface 26a of a first support 24a, and a second battery cell 22b fabricated on the top surface 26b of a second support 24b as shown in FIG. 9. The second support 24b is flipped over so that the second battery cell 22b faces the first battery cell 22a to form a gap 70 therebetween. Before or after flipping over the second support 24b, polymer 52 is applied to cover the top surface 58a of the first battery cell 22a, and the second support 24b is pressed into the polymer 52 using a pressure-applying apparatus 64 as described above. Polymer 52 can also be applied to cover both of the battery cells 22a,b for example by dipping both of the supports 24a,b into a polymer solution 62 as described above. The top surfaces 58a,b of the first and second battery cells 22a,b are joined to one another by heating and applying a pressure to the battery assembly using the pressure-applying apparatus 64 as described above. The polymer 52 fills the gap 70 between the first and second battery cells 22a,b which has a gap distance of from about 10 microns to 50 microns, and covers the top surfaces 58a,b and the side perimeter surfaces 54 of the first and second battery cells 22a,b. The polymer 52 can have a thickness of less than 60 microns. First and second terminals 25a,c and 25b,d respectively, extend out of the side of the polymer 52. Alternatively, a portion of the polymer 52 can be removed to expose the first terminals 25a,c and the second terminals 25b,d that are connected to the first and second battery cells 22a,b.

In this version, the supports 24a,b serve as covers, so additional covers not needed. However, if further protection from the environment is needed for a particular application, a conformal cover 66*a*, as shown by the dashed line, can be applied to cover all of these exposed surfaces of the supports 24*a,b* and polymer 52. The conformal cover 66*a* in combination with the supports 24*a,b* and the polymer 52 forms a protective shell 21. As described above, the conformal coating 66*a* can include first and second layers (not shown), the second layer being a different material than the first layer. For example the first layer can be constructed of ceramic material and the second polymer material. Suitable ceramic materials include aluminum oxide, silicon oxide and diamond—the carbon.

Still another version of the battery 20 comprising a plurality of supports 24*a,b* that each have a plurality of battery cells 22*a,b* and 22*c,d* thereon, respectively, is shown in FIG. 10. In this version, a pair of battery cells 22*a,b* or 22*c,d* are constructed on each of the supports 24*a,b*, respectively. For example, the cells 22*a,b* and 22*c,d*, can be built on opposing surfaces of the supports 24*a,b* respectively, to form double-sided cell arrangements. A first battery cell 22*a* is formed on the planar bottom surface 27*a* of the first support 24*a*, and a second battery cell 22*b* is formed on the opposite, planar top surface 26*a* of the same support 24*a*. A third battery cell 22*c* is formed on the planar bottom surface 27*b* of a second support 24*b*, and a fourth battery cell 22*d* is formed on the opposite, planar top surface 26*b* of the same support 24*b*. Each battery cell 22*a-d* has similar structure as the single battery cell 22 previously described. This version of a battery stack with two opposing cells 22*a,b* and 22*c,d* can be formed using the same processes used to form the battery 20 with a single cell 22 as described in FIGS. 1A to 1C. For example, the supports 24*a,b* can each be flipped over to form the second battery cells 22*b* and 22*c*, respectively. Alternatively, the battery film components 30*b* of the second battery cell 22*b* can be formed simultaneously with the battery film components 30*a* of cell 22*a*, using chambers having multiple process zones.

Prior to, or after fabrication of the battery component films 30*a-d* of the battery cells 22*a-d*, a plurality of support holes 124*a-d* are laser drilled through the supports 24*a,b* for subsequent electrical connections between the battery cells 22*a-d* and external terminals 25*a'*, 25*b'*. The support holes 124*a-d* are drilled abutting or through the terminals 25*a-h* using a laser or mechanical drilling system, as described above. Thereafter, or before drilling the support holes 124*a-d*, polymer 52*a-c* is applied to cover each cell 22*a-d* using the dip coating or other procedures described above.

In the version shown, a pair of covers 66*b,c* are positioned below and above the battery cells 22*a,d*, respectively. The cover 66*b* has predrilled access holes 126*a,b*, which are aligned with the holes 124*a-d* to form a vertical stack of holes which can be filled with an electrically conductive material to form the electrical interconnects 128*a,b* which connect to the external terminals 25*a'*, 25*b'* respectively. It should be noted that if the supports 24*a,b* only have battery cells 22*b,c* on their inside-facing surfaces, then the covers 66*b,c* are not needed because the backside of the supports 24*a,b* themselves serve as covers.

Instead of, or in addition to the covers 66*b,c*, the protective casing 21 can include a conformal cover 66*a* which covers the entire assembly. When applied without the covers 66*b,c*, the conformal cover 66*a* would be deposited directly over the polymer 52*a-c*. The conformal cover 66*a* comprises a plurality of different layers (not shown), which may include ceramic and polymer layers as described above.

While illustrative embodiments of the battery 20 are described in the present application, it should be understood that other embodiments are also possible. The exemplary methods of fabricating the batteries described herein are provided only to illustrate the present invention, and other methods may be used to fabricate the battery 20 as would be apparent to those of ordinary skill in the art. Furthermore, the materials of the battery components films 30 are also exemplary and may comprise other materials. Also, the battery 20 may have a plurality of battery cells 22 arranged in a convoluted or non-symmetrical shape depending on the application. Further, the protective casing can be applied to contain and seal off other types of batteries, as would be apparent to those of ordinary skill in the art. Thus the scope of the claims should not be limited by the exemplary methods of manufacture, materials and structures provided herein.

What is claimed is:

1. A thin film lithium battery comprising:
   (a) at least one battery cell on a support, the battery cell comprising (i) battery component layers that are thin films, the battery component layers including a plurality of electrodes about an electrolyte, and (ii) a top surface;
   (b) a protective casing contacting the battery cell, the casing comprising:
      (i) polyvinylidene chloride polymer contacting and covering the top surface of the battery cell, the polyvinylidene chloride polymer having a top surface; and
      (ii) a metal film contacting the top surface of the polyvinylidene chloride polymer, the metal film comprising aluminum, copper, titanium, or nickel;
   (c) a plurality of layers covering at least a portion of the polyvinylidene chloride polymer or metal film, the plurality of layers comprising first and second layers, the second layer being a different material than the first layer; and
   (d) first and second terminals extending out of the protective casing, the first and second terminals being connected to different electrodes of the battery cell.

2. A battery according to claim 1 wherein the polyvinylidene chloride polymer further covers the side perimeter surfaces of the battery cell.

3. A battery according to claim 1 wherein the polyvinylidene chloride polymer further covers a peripheral edge of the battery.

4. A battery according to claim 1 wherein the first layer comprises ceramic and the second layer comprises polymer.

5. A battery according to claim 4 wherein the ceramic comprises diamond-like carbon, silicon oxide or aluminum oxide.

6. A thin film lithium battery comprising:
   (a) at least one battery cell on a support, the battery cell comprising battery component layers that are thin films, the battery component layers including a plurality of electrodes about an electrolyte, and the battery cell having a top surface;
   (b) a protective casing contacting the battery cell, the casing comprising:
      (i) polyvinylidene chloride polymer contacting and covering the top surface of the battery cell, the polyvinylidene chloride polymer having a top surface; and
      (ii) a metal film contacting the top surface of the polyvinylidene chloride polymer to follow a contour of the battery cell, the metal film comprising aluminum, copper, titanium, or nickel;

(c) a plurality of layers covering at least a portion of the polyvinylidene chloride polymer or metal film, the plurality of layers comprising first and second layers, the second layer being a different material than the first layer; and (d) first and second terminals extending out of the protective casing, the first and second terminals being connected to different electrodes of the battery cell.

7. A battery according to claim 6 wherein the top surface of the battery cell comprises an electrode that is an anode.

8. A battery according to claim 6 wherein the polyvinylidene chloride polymer conforms to depressions and protrusions of the top surface of the battery cell to planarize the battery cell.

9. A battery according to claim 6 wherein the polyvinylidene chloride polymer comprises a thickness of less than 60 microns.

10. A battery according to claim 6 wherein the first layer comprises a ceramic and the second layer comprises a polymer.

11. A battery according to claim 10 wherein the ceramic comprises diamond-like carbon, silicon oxide or aluminum oxide.

12. A battery according to claim 10 wherein the polymer comprises a thermoset polymer, thermoplastic polymer, epoxy, polyurethane, polyvinylidene chloride, polyvinylidene fluoride, fluoropolymer, polytetrafluoroethylene, perfluoroalkoxy polymer resin, fluorinated ethylene-propylene, polyethylenetetrafluoroethylene, polyvinylfluoride, polyethylenechlorotrifluoroethylene, polyvinylidene fluoride, polychlorotrifluoro ethylene or parylene.

13. A battery according to claim 6 wherein the electrolyte comprises a lithium-containing material.

14. A battery according to claim 13 wherein the electrodes comprise a lithium-containing material.

15. A battery according to claim 6 wherein the polyvinylidene chloride polymer comprises:

(1) a water vapor permeability <0.1 g*mm/(m$^2$*day); and
(2) an oxygen and nitrogen permeability <0.1 (cm$^3$*mm)/(m$^2$*day).

16. A battery according to claim 6 wherein the polyvinylidene chloride polymer further covers the side perimeter surfaces of the battery cell.

17. A battery according to claim 6 wherein the plurality of layers comprises additional layers of ceramic, polymer, or other materials.

18. A battery according to claim 6 further comprising a cover covering the plurality of layers.

19. A battery according to claim 18 wherein the cover comprises a ceramic, flexible film or support.

20. A battery according to claim 18 wherein the cover is shaped and sized so that portions of electrodes comprising the cathode current collector and anode current collector extend beyond the area covered by the cover to be exposed as the first and second terminals.

21. A thin film lithium battery comprising:

(a) at least one battery cell on a support, the battery cell comprising battery component layers that are thin films, the battery component layers including an anode and cathode about an electrolyte, and the battery cell having a top surface;

(b) a protective casing contacting the battery cell, the casing comprising:

(i) a polyvinylidene chloride polymer contacting and covering the top surface of the battery cell, the polyvinylidene chloride polymer having a top surface; and (ii) a metal film contacting the top surface of the polyvinylidene chloride polymer, the metal film comprising aluminum, copper, titanium, or nickel;

(c) a plurality of layers covering at least a portion of the polyvinylidene chloride polymer or metal film, the plurality of layers comprising a ceramic layer and a polymer layer; and (d) first and second terminals extending out of the protective casing, the first and second terminals being connected to different electrodes of the battery cell.

22. A battery according to claim 21 wherein the polyvinylidene chloride polymer further covers the side perimeter surfaces of the battery cell.

23. A battery according to claim 21 wherein the polyvinylidene chloride polymer comprises a thickness of less than 60 microns.

24. A battery according to claim 21 wherein the ceramic layer comprises diamond-like carbon, silicon oxide or aluminum oxide.

25. A battery according to claim 21 wherein the electrolyte comprises a lithium-containing material.

* * * * *